US008938115B2

(12) United States Patent
Bertozzi et al.

(10) Patent No.: US 8,938,115 B2
(45) Date of Patent: Jan. 20, 2015

(54) SYSTEMS AND METHODS FOR DATA FUSION MAPPING ESTIMATION

(75) Inventors: Andrea L. Bertozzi, Santa Monica, CA (US); Laura M. Smith, Los Angeles, CA (US); Matthew S. Keegan, Los Angeles, CA (US); Todd Wittman, Los Angeles, CA (US); George O. Mohler, San Jose, CA (US)

(73) Assignee: The Regents of the University of California, Oakland, CA (US)

( * ) Notice: Subject to any disclaimer, the term of this patent is extended or adjusted under 35 U.S.C. 154(b) by 12 days.

(21) Appl. No.: 13/306,919

(22) Filed: Nov. 29, 2011

(65) Prior Publication Data

US 2012/0257818 A1 Oct. 11, 2012

Related U.S. Application Data

(60) Provisional application No. 61/417,717, filed on Nov. 29, 2010.

(51) Int. Cl.
*G06K 9/62* (2006.01)
(52) U.S. Cl.
CPC ................................ *G06K 9/6268* (2013.01)
USPC .......................................... 382/155; 382/160
(58) Field of Classification Search
None
See application file for complete search history.

(56) References Cited

U.S. PATENT DOCUMENTS

| 5,781,704 | A | 7/1998 | Rossmo |
| 6,314,204 | B1 | 11/2001 | Cham et al. |
| 6,353,679 | B1 | 3/2002 | Cham et al. |
| 6,374,216 | B1 * | 4/2002 | Micchelli et al. ............. 704/236 |
| 6,968,342 | B2 | 11/2005 | Wolman et al. |
| 7,346,597 | B2 | 3/2008 | Dumas |
| 7,660,441 | B2 | 2/2010 | Chen et al. |
| 2009/0280829 | A1 | 11/2009 | Feuerstein |

OTHER PUBLICATIONS

O'Leary, M., The Mathematics of Geographic Profiling, 2007, Retrieved from http://pages.towson.edu/moleary/docs/Presentations/2007%20IPAM.pdf., slides 1-62.*

Mohler, G.O., Bertozzi, A.L., Goldstein, T.A., and Osher, S.J., Fast TV regularization for 2D Maximum Penalized Likelihood Estimation, made publicly available on a UCLA FTP server on Mar. 11, 2009, pp. 1-19.* de Montricher, G.F., Tapia, R.A., Thompson, J.R., Nonparametric Maximum Likelihood Estimation of Probability Densities by Penalty Function Methods, 1975, The Annals of Statistics, vol. 3, No. 6, pp. 1329-1348.*

(Continued)

*Primary Examiner* — Stephen R Koziol
*Assistant Examiner* — Jonathan S Lee
(74) *Attorney, Agent, or Firm* — John P. O'Banion

(57) ABSTRACT

Systems and methods are disclosed for generating a probability density to estimate the probability that an event will occur in a region of interest. The methods input spatial event data comprising one or more events occurring in the region of interest along with auxiliary data related to the region of interest. The auxiliary data comprises non-event data having spatial resolution such that the probability density estimate for the region of interest is calculated based on a function of the auxiliary data and the event data. In particular, the auxiliary data is used to generate a penalty functional used in the calculation of the probability density estimate.

14 Claims, 15 Drawing Sheets

(56) References Cited

OTHER PUBLICATIONS

Sardy, S. and Tseng, P., Density estimation by total variation penalized likelihood driven by the sparsity l1 information criterion, Scandinavian Journal of Statistics, 2010, vol. 37, No. 2, pp. 321-337.*

Silverman, B.W., On the Estimation of a Probability Density Function by the Maximum Penalized Likelihood Method, 1982, The Annals of Statistics, vol. 10, No. 3, pp. 795-810.*

Xifan Zheng; Yang Cao; Zhiyu Ma, "A mathematical modeling approach for geographical profiling and crime prediction," Software Engineering and Service Science (ICSESS), 2011 IEEE 2nd International Conference on , vol., No., pp. 500,503, Jul. 15-17, 2011.*

Yuhong Yang; Barron, A.R., "An asymptotic property of model selection criteria," Information Theory, IEEE Transactions on , vol. 44, No. 1, pp. 95,116, Jan. 1998.*

Ke, C. and Wang, Y., Semi-parametric Nonlinear Mixed Effects Models and Their Applications, 2000, Journal of the American Statistical Association, vol. 96, No. 456, pp. 1-35.*

Smith, L.M., Keegan, M.S., Wittman, T., Mohler, G.O., and Bertozzi, A.L., Improving Density Estimation by Incorporating Spatial Information, 2010, EURASIP Journal on Advances in Signal Processing, pp. 1-12.*

* cited by examiner

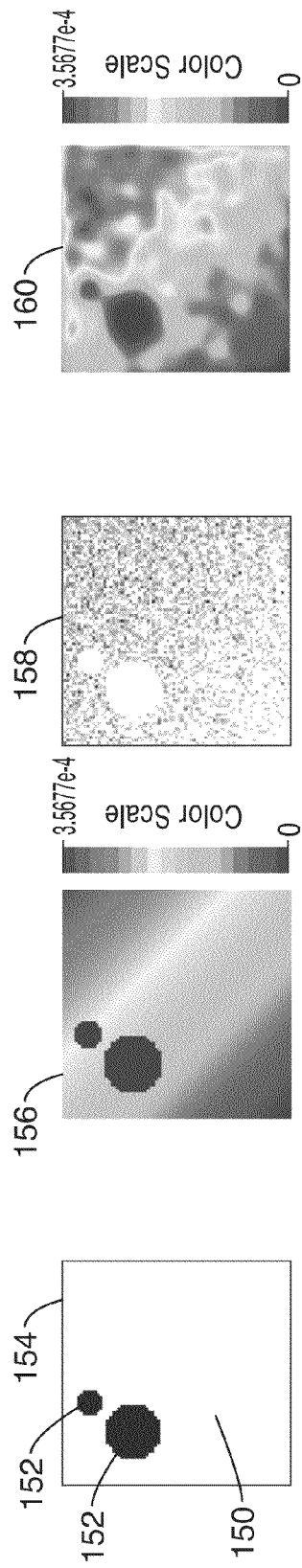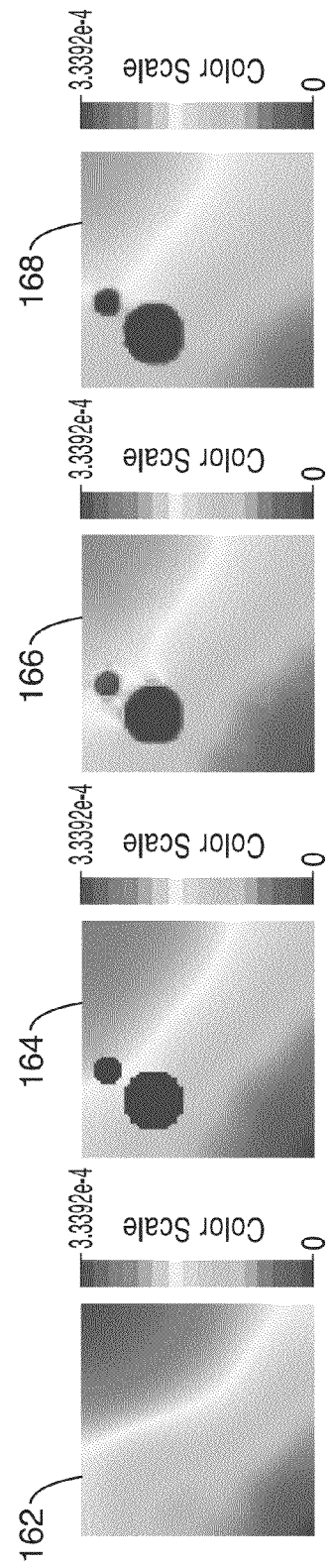

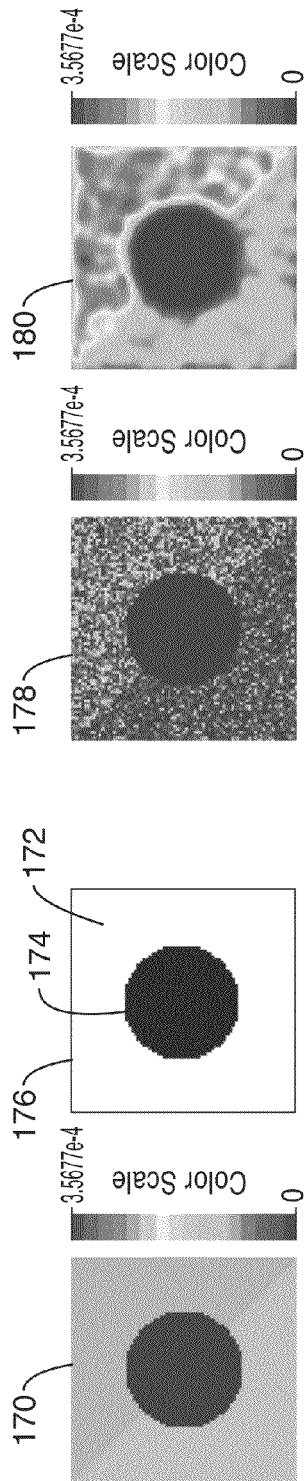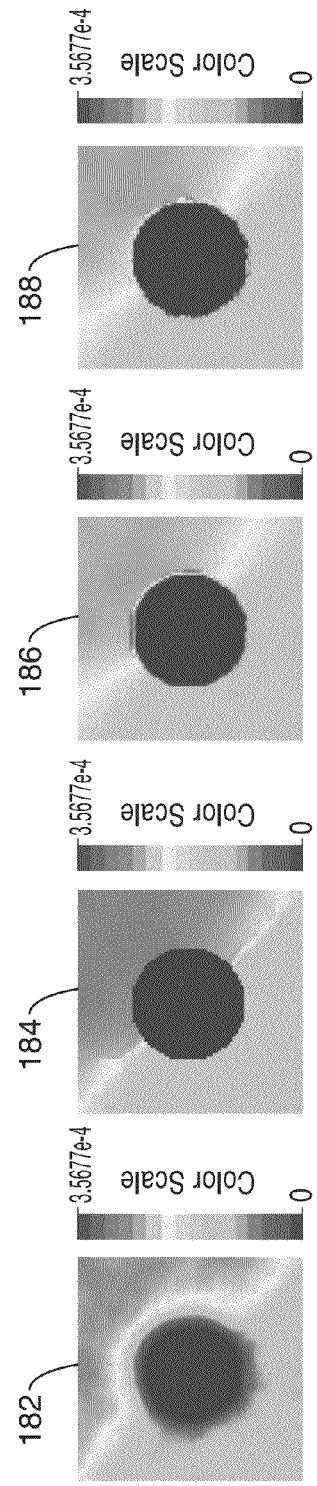

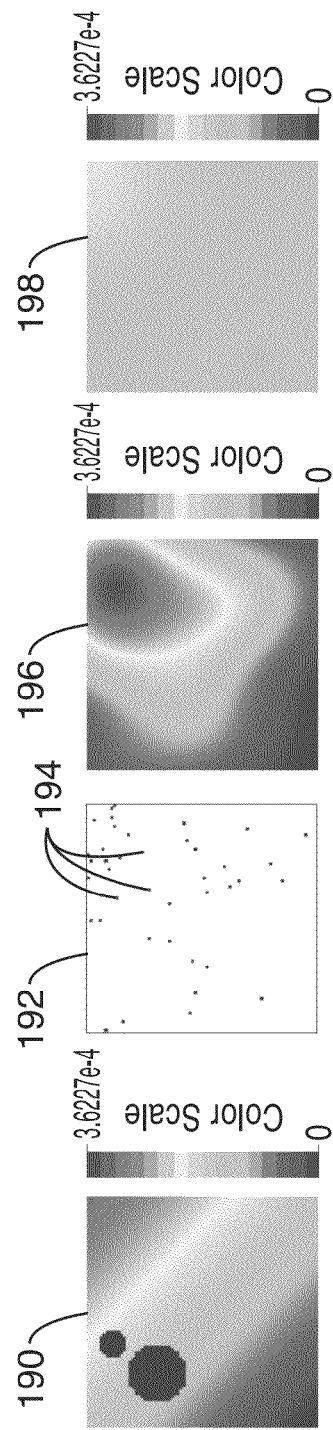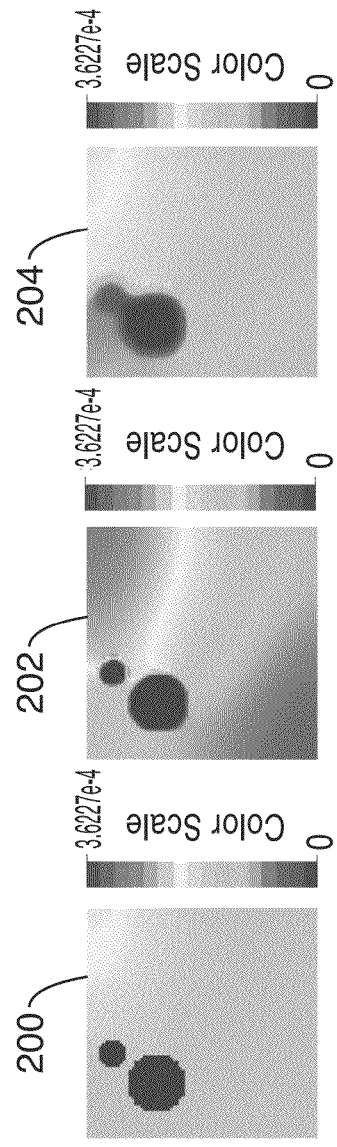

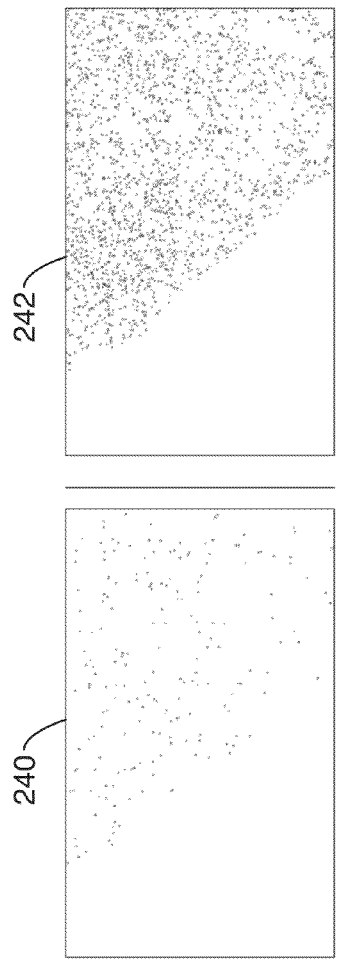
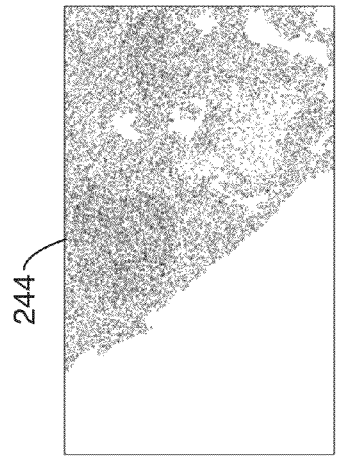
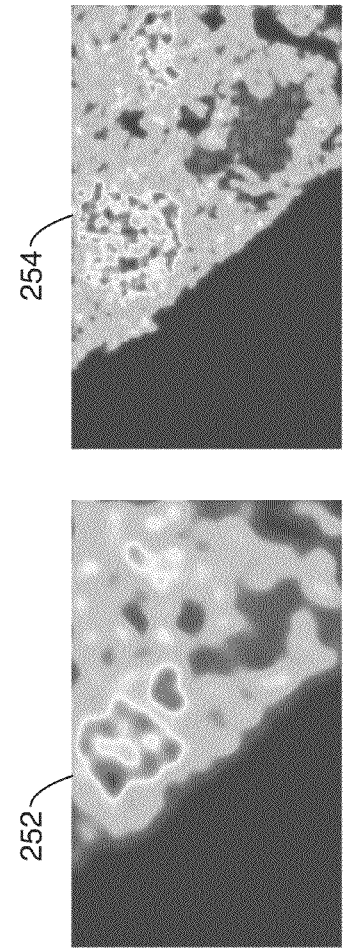
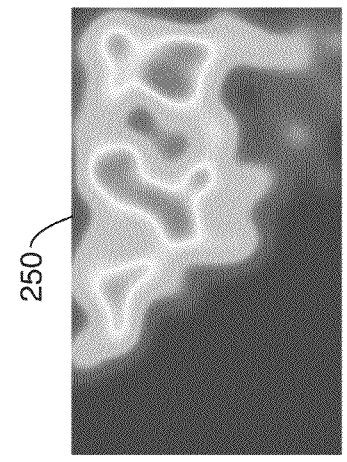
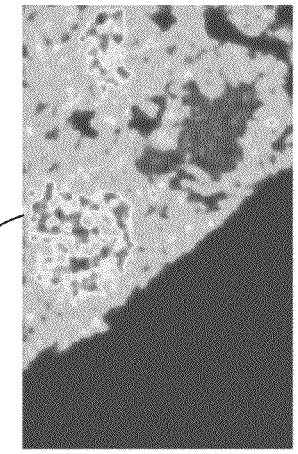
FIG. 11A    FIG. 11B    FIG. 11C
FIG. 12A    FIG. 12B    FIG. 12C

SYSTEMS AND METHODS FOR DATA FUSION MAPPING ESTIMATION

CROSS-REFERENCE TO RELATED APPLICATIONS

This application claims priority from U.S. provisional patent application Ser. No. 61/417,717 filed on Nov. 29, 2010, incorporated herein by reference in its entirety.

STATEMENT REGARDING FEDERALLY SPONSORED RESEARCH OR DEVELOPMENT

This invention was made with Government support under 0527388 and 0914856, awarded by the National Science Foundation; W911NF-07-1-0044 and W911NF-09-1-0559, awarded by the U.S. Army, Army Research Office; HM1582-06-1-2034, awarded by the U.S. Department of Defense; and, N00014-08-1-0363 and N00014-10-1-0221, awarded by the U.S. Navy, Office of Navy Research. The Government has certain rights in the invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to probability density estimation, and more particularly to probability density estimation in imagery.

2. Description of Related Art

High resolution and hyperspectral satellite images, city and county boundary maps, census data, and other types of geographical data provide much information about a given region. It is desirable to integrate this knowledge into models defining geographically dependent data.

Given spatial event data, a probability density may be constructed that estimates the probability that an event will occur in a region. Often, it is unreasonable for events to occur in certain regions, and thus it is ideal for the model to reflect this restriction. For example, residential burglaries and other types of crimes are unlikely to occur in oceans, mountains, and other regions. Such areas can be determined using aerial images or other external spatial data, and these improbable locations are generally denoted as an invalid region. Ideally, the support of all density data should therefore be contained in the valid region.

Geographic profiling, a related topic, is a technique used to create a probability density from a set of crimes by a single individual to predict where the individual is likely to live or work. Some law enforcement agencies currently use software that makes predictions in unrealistic geographic locations. Methods that incorporate geographic information have recently been proposed and is an active area of research.

A common method for creating a probability density is to use Kernel Density Estimation, which approximates the true density by a sum of kernel functions. A popular choice for the kernel is the Gaussian distribution which is smooth, spatially-symmetric, and has non-compact support. Other probability density estimation methods include the taut string, logspline, and the Total Variation Maximum Penalized Likelihood Estimation models. However, none of these methods utilize information from external spatial data. Consequently, the density estimate typically has some nonzero probability of events occurring in the invalid region.

BRIEF SUMMARY OF THE INVENTION

The present invention includes systems and methods for mapping of threat level probabilities for crime based on event data and geographic features from additional datasets. The method could also be adapted for solving geographic profiling problems or for the use of wireless technology to ascertain geographic location. The method is currently used to estimate likelihood of residential burglaries from existing event data and from additional data such as residential census data. The approach embodies new fast computational methods for density estimation using maximum penalized likelihood estimation.

Given discrete event data, the systems and methods of the present invention produce a probability density that can model the relative probability of events occurring in a spatial region. Common methods of density estimation, such as Kernel Density Estimation, do not incorporate geographical information, which may result in non-negligible portions of the support of the density in unrealistic geographic locations. For example, crime density estimation models that do not take geographic information into account may predict events in unlikely places such as oceans, mountains, etc.

The systems and methods of the present invention includes set of Maximum Penalized Likelihood Estimation methods based on Total Variation and $H_1$ Sobolev norm regularizers, in conjunction with a priori high resolution spatial data to obtain more geographically accurate density estimates. The methods were applied to a residential burglary data set of the San Fernando Valley using geographic features obtained from satellite images of the region and housing density information.

One aspect of the present invention is a novel set of models that restrict the support of the density estimate to the valid region and ensure realistic behavior. The models use Maximum Penalized Likelihood Estimation, which is a variational approach. The density estimate is calculated as the minimizer of some predefined energy functional. The systems and methods of the present invention uniquely define the energy functional with explicit dependence on the valid region, such that the density estimate obeys assumptions of its support.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 6A shows an image having a valid region and invalid region.

FIG. 6B shows the true density for the example of FIGS. 6A through 6H.

FIG. 6C illustrates an image having 4,000 events that were selected randomly from the valid region of FIG. 6B.

FIG. 6D shows density estimation results for the density of FIG. 6B using Kernel Density Estimation.

FIG. 6E shows density estimation results for the density of FIG. 6B using Maximum Penalized Likelihood Estimation based on Total Variation (TV MPLE).

FIG. 6F shows density estimation results for the density of FIG. 6B using the modified TV MPLE method of the present invention.

FIG. 6G shows density estimation results for the density of FIG. 6B using the Weighted $H_1$ Maximum Penalized Likelihood Estimation method in accordance with the present invention.

FIG. 6H shows density estimation results for the density of FIG. 6B using the weighted TV MPLE method of the present invention.

FIG. 7A shows a piecewise-constant true density used in the example of FIGS. 7A through 7H.

FIG. 7B shows an image that represents the valid region for the density of FIG. 7A.

FIG. 7C illustrates an image having 8,000 events that were selected randomly from the true density of FIG. 7A.

FIG. 7D illustrates an image showing density estimation results for the density of FIG. 7A using Kernel Density Estimation.

FIG. 7E illustrates an image showing density estimation results for the density of FIG. 7A using Maximum Penalized Likelihood Estimation based on Total Variation (TV MPLE).

FIG. 7F illustrates an image showing density estimation results for the density of FIG. 7A using the modified TV MPLE method of the present invention.

FIG. 7G illustrates an image showing density estimation results for the density of FIG. 7A using the Weighted $H_1$ Maximum Penalized Likelihood Estimation method in accordance with the present invention.

FIG. 7H illustrates an image showing density estimation results for the density of FIG. 7A using the weighted TV MPLE method of the present invention.

FIG. 8A shows a true density image for the example of FIGS. 8A through 8G.

FIG. 8B illustrates an image having events that were selected randomly from the true density image of FIG. 8A.

FIG. 8C illustrates an image showing density estimation results for the density of FIG. 8A using Gaussian Kernel Density Estimation.

FIG. 8D illustrates an image showing density estimation results for the density of FIG. 8A using Maximum Penalized Likelihood Estimation based on Total Variation (TV MPLE).

FIG. 8E illustrates an image showing density estimation results for the density of FIG. 8A using the modified TV MPLE method of the present invention.

FIG. 8F illustrates an image showing density estimation results for the density of FIG. 8A using the Weighted $H_1$ Maximum Penalized Likelihood Estimation method in accordance with the present invention.

FIG. 8G illustrates an image showing density estimation results for the density of FIG. 8A using the weighted TV MPLE method of the present invention.

FIGS. 11A through 11C show images having distinct data sets of 200, 2,000 and 20,000 selected events respectively, chosen from the density map of FIG. 10B.

FIGS. 12A through 12C show images demonstrating Gaussian Kernel Density estimates for 200, 2,000, and 20,000 sampled events of the Orange County Coastline image of FIG. 10B.

DETAILED DESCRIPTION OF THE INVENTION

Figure 1:
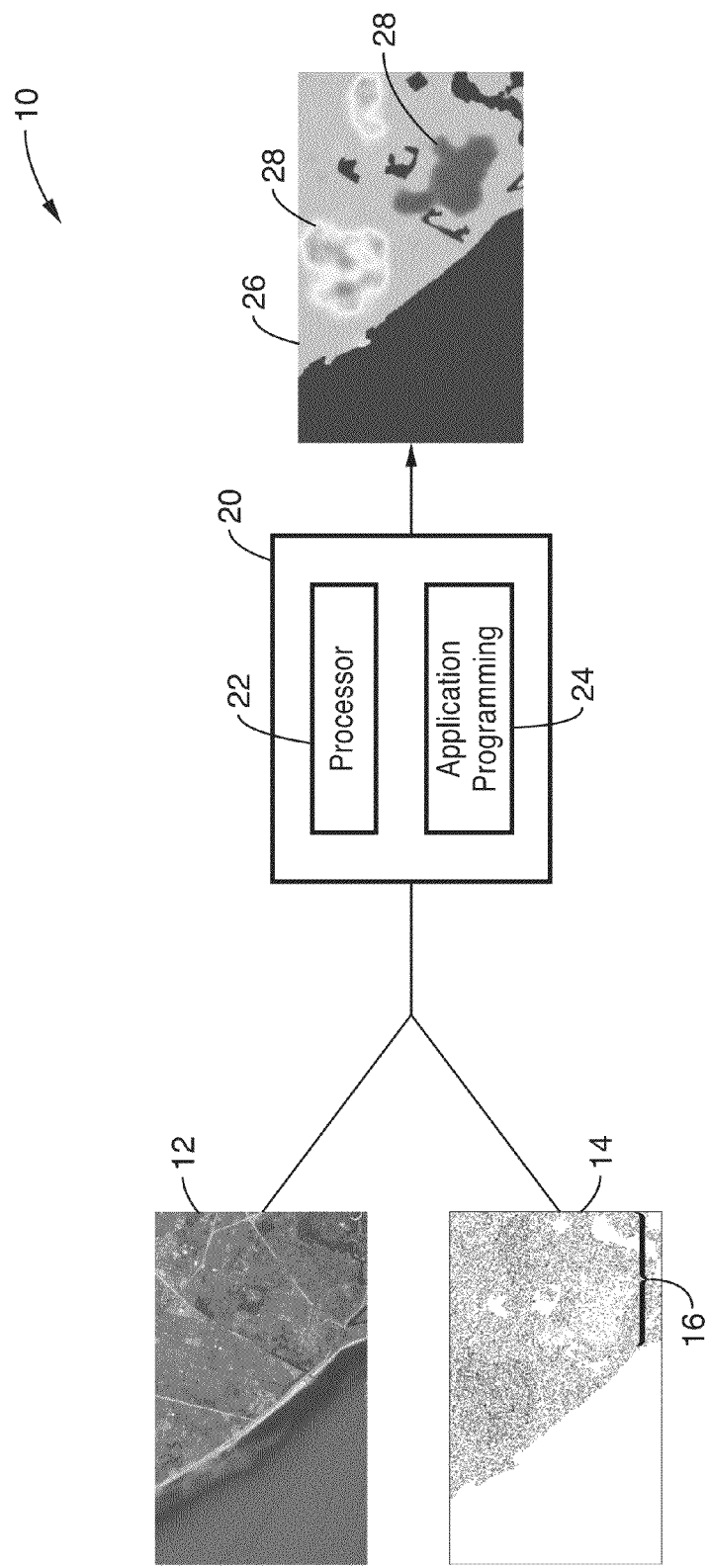
FIG. 1 shows diagram of a density estimation system in accordance with the present invention

FIG. 1 shows a probability density estimation system 10 in accordance with the present invention. System 10 includes a computer 20 having a processor 22 for executing application programming 24. Application programming 24 is configured to process auxiliary data 12 and event data 16 from image 14 to generate proability density data 28 in image 26.

Figure 9A:
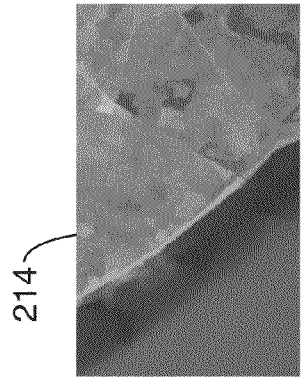
FIG. 9A shows an initial aerial image of a region to be considered.

Auxiliary data 12 may be any non-event data that may have value in prediction of the event(s) or populous of interest. In particular, auxiliary data 12 may comprise data having a high spacial resolution having edge data that is useful in generating boundaries for the density estimation. For example, the auxiliary data 12 may comprise aerial or satellite imagery as shown in FIG. 1 or 9A. Auxiliary data may also comprise census data, such as that shown in FIG. 15C, or other data such as jurisdictional data or marketing data.

Event data 16 is generally related to a populus, and may comprise crime data, insurgent data, migratory data, marketing data or any data that corresponds to an event, occurrence or characteristic of a populus within a geographic area.

Application programming 24 preferably comprises machine readable code configured to apply one of two novel algorithms: hereinafter labeled the Modified Total Variation MPLE Model and the Weighted $H_1$ Sobolev MPLE Model, both of which are described in further detail below. While the above algorithms models are ideal, it is appreciated that the methods of the present invention may employ variations (e.g. combination of Modified TV MPLE Model and the Weighted $H_1$ Sobolev MPLE Model) of these, models, or other models, while still utilizing the auxiliary data as a function in calculating probability density.

Application programming may also comprise pre-processing routines (e.g. segmentation techniques, etc.) for conditioning raw data, such as aerial data or census data, into regions where data is valid and regions where data is invalid or of lesser interest.

It is important to note that the application programming 24 is not configured to merely overlay auxiliary data 12 on to the probability density map, as this would merely serve to cover up non-zero data that was calculated to occur in the invalid region. Rather, application programming 24 uses the auxiliary data 12 as a function in calculating the probability density, and more particularly as a penalty functional in calculating the probability density to push probability calculations away from invalid regions (e.g. minimize or remove smoothing of non-zero probability data into invalid regions).

Assuming that u(x) is the desired probability density for x ∈ $R^2$, and the known location of events occur at $x_1, x_2, \ldots, x_n$, then standard Maximum Penalized Likelihood Estimation (MPLE) models are given by Eq. 1:

$$\hat{u}(x) = \operatorname{argmin} \int_\Omega u\, dx = 1, 0 \le u \left\{ P(u) - \mu \sum_{i=1}^n \log(u(x_i)) \right\}. \qquad \text{Eq. 1}$$

Here, P(u) is a penalty functional, which is generally designed to produce a smooth density map. The parameter μ determines how strongly weighted the maximum likelihood term is compared to the penalty functional.

A range of penalty functionals have been proposed, including $P(u)=\int_\Omega |\nabla\sqrt{u}|^2\, dx$ and $P(u)=\int_\Omega |\nabla^3(\log(u))|^2\, dx$. More recently, variants of the Total Variation (TV) functional, $P(u)=\int_\Omega |\nabla u|\, dx$, have been proposed for MPLE. However, current methods employing Maximum Penalized Likelihood Estimation (MPLE) models do not incorporate the information that can be obtained from the external spatial data. Even though the TV functional will maintain sharp gradients, the boundaries of the constant regions do not necessarily agree with the boundaries within the image. These methods also perform poorly when the data is too sparse, as the density is smoothed to have equal probability almost everywhere. This, and prediction of events in the invalid region with non-negligible estimates, are described in further detail below.

The system and methods of the present invention use a penalty functional that depends on the valid region that is generated from auxiliary data from geographical images or other external spatial data, and in particular use the Modified Total Variation MPLE or Weighted $H_1$ Sobolev MPLE methods described in further detail below.

I. Modified Total Variation MPLE Model

A first embodiment of the present invention is a method of applying a Modified Total Variation MPLE Model for density estimation. An extension of the Maximum Penalized Likelihood Estimation method is shown in Eq. 2:

$$\hat{u}(x) = \operatorname{argmin} \int_\Omega u\, dx = 1, \qquad \text{Eq. 2}$$

$$0 \le u \left\{ \int_\Omega |\nabla u|\, dx - \mu \sum_{i=1}^n \log(u(x_i)) \right\}$$

Once a valid region is determined, it is desirable to align the level curves of the density function u with the boundary of the valid region. The Total Variation functional allows discontinuities in its minimizing solution. By aligning the level curves of the density function with the boundary, a discontinuity is encouraged to occur there to keep the density from smoothing into the invalid region.

Since $$\frac{\nabla u}{|\nabla u|}$$

gives the unit normal vectors to the level curves of u, Eq. 3 may be applied as follows:

$$\frac{\nabla(1_D)}{|\nabla(1_D)|} = \frac{\nabla u}{|\nabla u|}, \qquad \text{Eq. 3}$$

where $(1_D)$ is the characteristic function of the valid region D. The region D is obtained from or auxiliary external spatial data, such as aerial image 12. To avoid division by zero, we use $$\theta = \frac{\nabla(1_D)}{|\nabla(1_D)|_\varepsilon},$$

where $|\nabla v|_\varepsilon = \sqrt{v_x^2 + v_y^2 + \varepsilon^2}$. To align the density function and the boundary, it is desirable to minimize $|\nabla u| - \theta \cdot \nabla u$. Integrating this and applying integration by parts, the term $\int_\Omega |\nabla u| + u\nabla \cdot \theta\, dx$ is obtained. We propose the following Modified Total Variation penalty functional, adopting the more general form of the above functional:

$$\hat{u}(x) = \operatorname{argmin} \int_\Omega u\, dx = 1, \qquad \text{Eq. 4}$$

$$0 \le u \left\{ \int_\Omega |\nabla u|\, dx + \lambda \int_\Omega u\nabla \cdot \theta\, dx - \mu \sum_{i=1}^n \log(u(x_i)) \right\}.$$

The parameter λ allows variation of the strength of the alignment term, with θ corresponding to vectors obtained though the auxiliary data in the valid region.

II. Weighted $H_1$ Sobolev MPLE Model

A Maximum Penalized Likelihood Estimation method with penalty functional $$\int_\Omega \frac{1}{2} |\nabla u|^2 \, dx,$$

the $H_1$ Sobolev norm, gives results equivalent to those obtained using Kernel Density Estimation. The $H_1$ regularizer term is enforced away from the boundary of the invalid region. This results in Eq. 5

$$\hat{u}(x) = \operatorname{argmin}_{\int_\Omega u \, dx = 1, 0 \leq u} \left\{ \frac{1}{2} \int_{\Omega/\partial D} |\nabla u|^2 \, dx - \mu \sum_{i=1}^n \log(u(x_i)) \right\}. \quad \text{Eq. 5}$$

The $H_1$ term is approximated by introducing the Ambrosio-Tortorelli approximating function $z_\epsilon(x)$, where $z_\epsilon \to (1-\delta(\partial D))$ in the sense of distributions. More precisely, a continuous function is used, which has the property of Eq 6:

$$z_\epsilon(x) = \begin{cases} 1 & \text{if } d(x, \partial D) > \epsilon, \\ 0 & \text{if } x \in \partial D. \end{cases} \quad \text{Eq. 6}$$

Thus, the minimization problem is applied as Eq. 6

$$\hat{u}(x) = \operatorname{argmin}_{\int_\Omega u \, dx = 1, 0 \leq u} \left\{ \frac{1}{2} \int_\Omega z_\epsilon^2 |\nabla u|^2 \, dx - \mu \sum_{i=1}^n \log(u(x_i)) \right\}. \quad \text{Eq. 7}$$

The weighting away from the edges is used to control the diffusion into the invalid region. This method of weighting away from the edges can also be used in combination with the Total Variation functional in the modified TV MPLE model, which is herein referred to this as the Weighted TV MPLE model.

III. Implementation a. Constraints

In the implementation for the Modified Total Variation MPLE method and Weighted $H_1$ MPLE method, the constraints $0 \leq u(x)$ and $\int_\Omega u(x) \, dx = 1$ are enforced to ensure that $u(x)$ is a probability density estimate. The $u \geq 0$ constraint is satisfied by solving quadratic equations that have at least one nonnegative root.

The $\int_\Omega u(x) \, dx = 1$ constraint is enforced by first adding it to the energy functional as an $L_2$ penalty term. For the $H_1$ method, this change results in the new minimization problem $$\hat{u}_H(x) = \arg \quad \text{Eq. 8}$$

$$\min_u \left\{ \frac{1}{2} \int_\Omega z_\epsilon^2 |\nabla u|^2 \, dx - \mu \sum_{i=1}^n \log(u(x_i)) + \frac{\gamma}{2} \left( \int_\Omega u(x) \, dx - 1 \right)^2 \right\},$$

where $\hat{u}_H(x)$ is denoted as the solution of the $H_1$ model. The constraint is then enforced by applying Bregman iteration. Using this method, the problem is formulated with Eq. 9:

$$(u_H, b_H) = \operatorname{argmin}_{u,b} \quad \text{Eq. 9}$$

$$\left\{ \frac{1}{2} \int_\Omega z_\epsilon^2 |\nabla u|^2 \, dx - \mu \sum_{i=1}^n \log(u(x_i)) + \frac{\gamma}{2} \left( \int_\Omega u(x) \, dx + b - 1 \right)^2 \right\},$$

where b is introduced as the Bregman variable of the sum to unity constraint. This problem is solved using alternating minimization, $$(H1) \begin{cases} u^{(k+1)} = \operatorname{argmin}_u \left\{ \frac{1}{2} \int_\Omega z_\epsilon^2 |\nabla u|^2 \, dx - \mu \sum_{i=1}^n \log(u(x_i)) + \right. \\ \left. \frac{\gamma}{2} \left( \int_\Omega u(x) \, dx + b^{(k)} - 1 \right)^2 \right\}, \\ b^{(k+1)} = b^{(k)} + \int_\Omega u^{(k+1)} \, dx - 1, \end{cases} \quad \text{Eq. 10}$$

with $b^{(0)} = 0$. Similarly for the modified TV method, the alternating minimization problem is solved with Eq. 11

$$(TV) \begin{cases} u^{(k+1)} \operatorname{argmin}_u \left\{ \frac{1}{2} \int_\Omega |\nabla u|^2 \, dx + \lambda \int_\Omega u \nabla \cdot \theta \, dx - \right. \\ \mu \sum_{i=1}^n \log(u(x_i)) + \\ \left. \frac{\gamma}{2} \left( \int_\Omega u(x) \, dx + b^{(k)} - 1 \right)^2 \right\}, \\ b^{(k+1)} = b^{(k)} + \int_\Omega u^{(k+1)} \, dx - 1, \end{cases} \quad \text{Eq. 11}$$

with $$b^{(0)} = 0.$$

b. Weighted $H_1$ MPLE Implementation

For the Weighted $H_1$ MPLE model, the Euler-Lagrange equation for the u minimization is given by Eq. 12:

$$(H1) - \nabla \cdot (z_\epsilon^2 \nabla u) - \frac{\mu}{u(x)} \sum_{i=1}^n \delta(x - x_i) + \quad \text{Eq. 12}$$

$$\gamma \frac{\gamma}{2} \left( \int_\Omega u(x) \, dx + b^{(k)} - 1 \right) = 0.$$

This is solved using a Gauss-Seidel method with central differences for the $\nabla z^2$ and $\nabla u$. Once the partial differential equation is discretized, solving this equation simplifies to solving the quadratic Eq. 13

$$(4z^2 + \gamma) u_{i,j}^2 - \alpha_{i,j} u_{i,j} - \mu w_{i,j} = 0 \quad \text{Eq. 13}$$

for the positive root, where:

$$\alpha_{i,j} = z_{i,j}^2 (u_{i+1,j} + u_{i-1,j} + u_{i,j+1} + u_{i,j-1}) + \quad \text{Eq. 14}$$

$$\left( \frac{z_{i+1,j}^2 - z_{i-1,j}^2}{2} \right) \left( \frac{u_{i+1,j} - u_{i-1,j}}{2} \right) +$$

$$\left( \frac{z_{i,j+1}^2 - z_{i,j-1}^2}{2} \right) \left( \frac{u_{i,j+1} - u_{i,j-1}}{2} \right) + \gamma \left( 1 - b^{(k)} - \sum_{(i',j') \neq (i,j)} u_{i',j'} \right),$$

and where $w_{i,j}$ is the given number of sampled events that occurred at the location (i, j). Parameters $\mu$ and $\gamma$ are chosen so that the Gauss-Seidel solver will converge. In particular, $\mu = O((NM)^{-2})$ and $\gamma = O(\mu(NM))$, where the image is N×M.

c. Modified TV MPLE Implementation

Minimization of the Total Variation penalty functional may be performed in a number of ways. A fast and simple method for doing this is to use the Split Bregman technique. In this approach, the variable d is substituted for $\nabla u$ in the TV norm, and then the equality $d = \nabla u$ is enforced using Bregman iteration. To apply Bregman iteration, the variable g is introduced as the Bregman vector of the d=∇u constraint. This results in a minimization problem in which we minimize with respect to both d and u.

Beginning the iteration with $g^{(0)}=0$, the minimization is written as $$(u^{(k+1)}, d^{(k+1)}) =$$ Eq. 15

$$\operatorname{argmin}_{u,d} \left\{ \|d\|_1 + \lambda \int_\Omega u\nabla \cdot \theta \, dx - \mu \sum_{i=1}^n \log(u(x_i)) + \frac{\gamma}{2}\left(\int_\Omega u(x)dx + b^{(k)} - 1\right)^2 + \frac{\alpha}{2}\|d - \nabla u - g^{(k)}\|_2^2 \right\},$$

$$g^{(k)} = g^{(k-1)} + \nabla u^{(k)} - d^{(k)}.$$

Alternating the minimization of $u^{(k+1)}$ and $d^{(k+1)}$, the final formulation for the TV model is applied as Eq. 16

$$(TV) \begin{cases} u^{(k+1)} \operatorname{argmin}_u \left\{ \lambda \int_\Omega u\nabla \cdot \theta \, dx - \mu \sum_{i=1}^n \log(u(x_i)) + \frac{\gamma}{2}\left(\int_\Omega u(x)dx + b^{(k)} - 1\right)^2 \right\}, \\ d_j^{(k+1)} = \operatorname{shrink}\left((\nabla u^{(k+1)})_j - d_j^{(k)}, \frac{1}{\alpha}\right) \\ g^{(k+1)} = g^{(k)} + \nabla u^{(k+1)} - d^{(k+1)} \\ b^{(k+1)} = b^{(k)} + \int_\Omega u^{(k+1)} dx - 1. \end{cases}$$ Eq. 16

The shrink function is given by Eq. 17:

$$\operatorname{shrink}(z, \eta) = \max\{|z| - \eta, 0\}\left(\frac{z}{|z|}\right).$$ Eq. 17

Solving for $d^{(k+1)}$ and $g^{(k+1)}$ the forward difference discretizations of Eq. 18 are used:

$$\nabla u^{(k+1)} = (u_{i+1,j} - u_{i,j}, u_{i,j+1} - u_{i,j})^T.$$ Eq. 18

The Euler-Lagrange equations for the variable $u^{(k+1)}$ are applied as Eq. 19:

$$-\frac{\mu}{u(x)}\sum_{i=1}^n \delta(x - x_i) + \lambda \operatorname{div}\theta - \alpha(\Delta u + \operatorname{div} g^k - \operatorname{div} d^k) + \gamma\left(\int_\Omega ux + b_1^k - 1\right) = 0.$$

Discretizing this simplifies to solving for the positive root of Eq. 20:

$$(4\alpha + \gamma)u_{i,j}^2 - \beta_{i,j}u_{i,j} - \mu w_{i,j} = 0$$ Eq. 20 where $$\beta_{i,j} = \alpha(u_{i+1,j} + u_{i-1,j} + u_{i,j+1} + u_{i,j-1}) - \lambda \operatorname{div}\theta - \alpha(d_{x,i,j}^k - d_{x,i-1,j}^k + d_{y,i,j}^k - d_{y,i,j-1}^k) + \alpha(g_{x,i,j}^k - g_{x,i-1,j}^k + g_{y,i,j}^k - g_{y,i,j-1}^k) + \gamma\left(1 - b^{(k)} - \sum_{(i',j') \neq (i,j)} u_{i',j'}\right).$$ Eq. 21

The term $u^{(k+1)}$ was solved with a Gauss-Seidel solver. Heuristically, it was found that using the relationships $\alpha=2$ $\mu N^2 M^2$ and $\gamma=2$ $\mu NM$ were sufficient for the solver to converge and provide good results. The parameter $\lambda$ was also set to have values between 1.0 and 1.2. The parameter $\mu$ is the last remaining free parameter. This parameter can be chosen using V-cross validation or other techniques, such as the sparsity $l_1$ information criterion.

IV. Application Programming

FIGS. 2-5 show methods configured to be implemented within application programming 24 to generate probability density data in an image. The methods of FIGS. 2-5 use either the Modified Total Variation MPLE Model or Weighted $H_1$ Sobolev MPLE Model, which both use a penalty functional that depends on the valid region that is determined from geographical images or other external spatial data.

a. Modified Total Variation Maximum Penalized Likelihood Estimation

Figure 2:
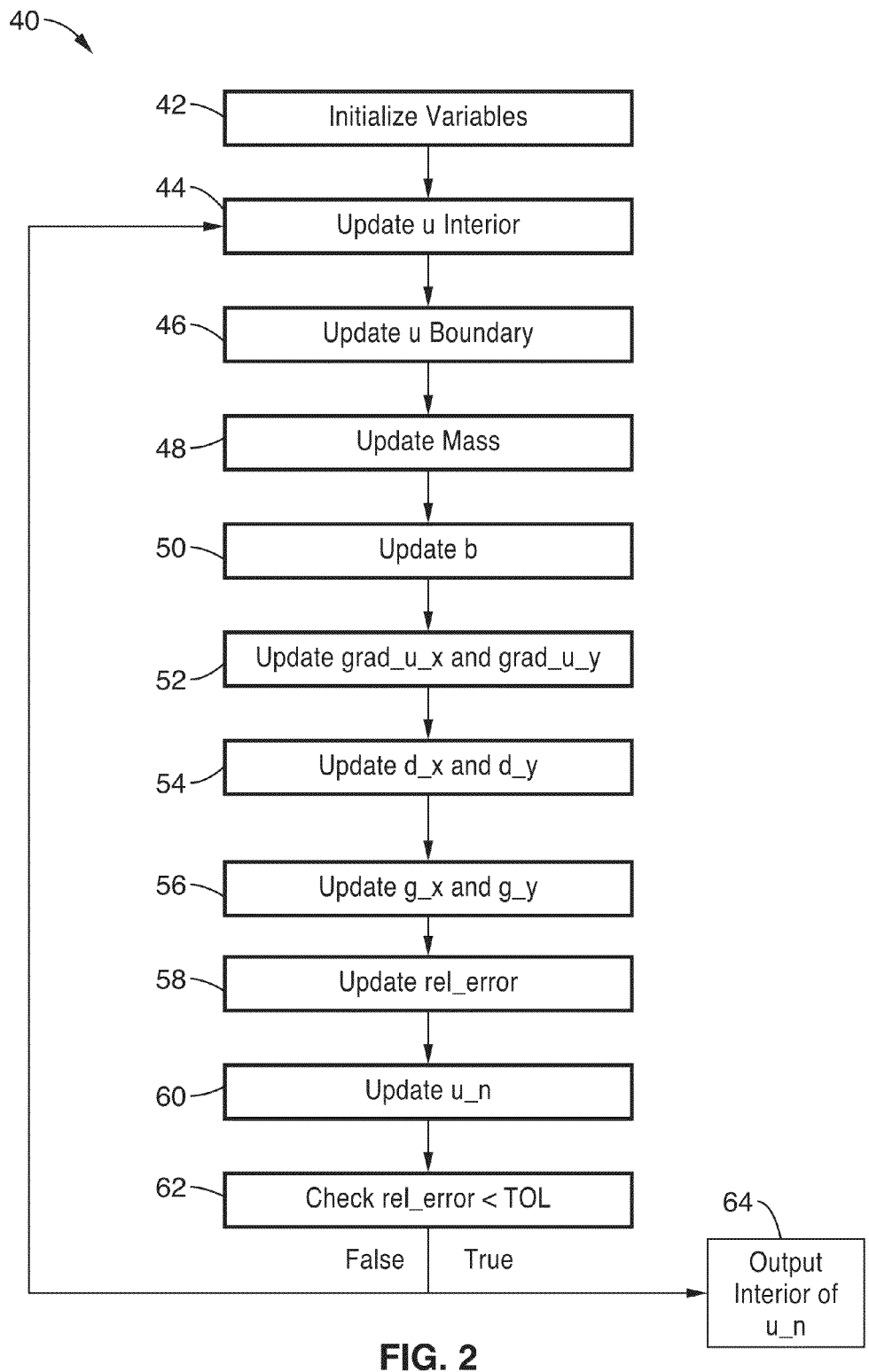
FIG. 2 shows a flow diagram for a method of performing density estimation using modified TV MPLE in accordance with the present invention.
Figure 3:
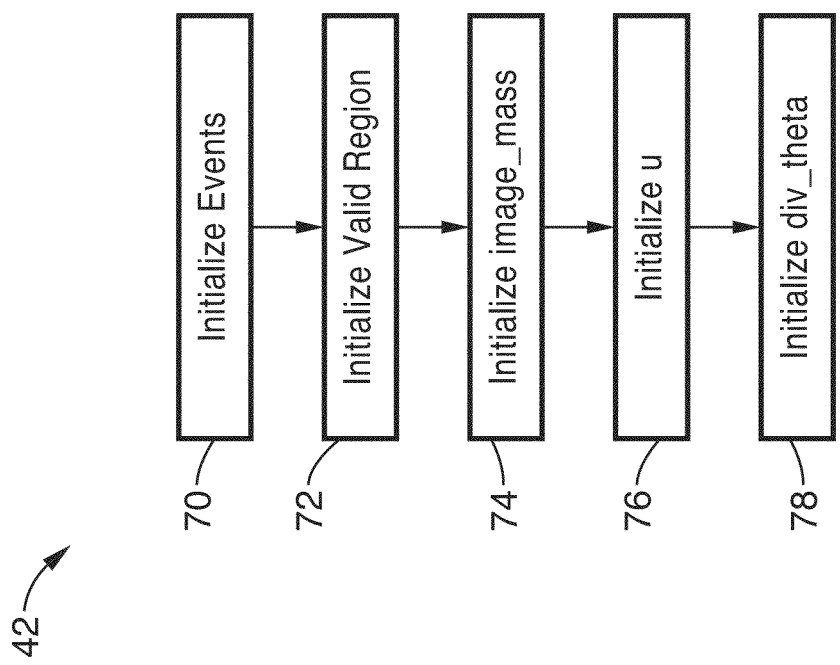
FIG. 3 illustrates the initialize variables step of the method shown in FIG. 2.

FIGS. 2 and 3 illustrate a method or routine 40 for generating probability density data using Modified Total Variation Maximum Penalized Likelihood Estimation in accordance with the present invention.

The routine 40 first initializes variables at step 42. Step 42, is only performed once, and is shown in more detail in FIG. 3. The routine first initializes the events variable at step 70. In this step, Events(i,j) is assigned to be the number of events that occurred in the region represented by grid element (i,j).

At step 72, the routine initializes the valid_region variable. The valid region data is input in the processed form such as that in image 220 in FIG. 10A, or image 278 in FIG. 15D. Step 72 may include routines that process the information, such as segmentation or other pre-proceeding described in FIGS. 9A though 9C for generating the valid region of FIG. 10A. In this step, we let valid_Region(i,j) be equal to one (1) where an event can occur (e.g. region 222 in FIG. 10A), and zero where it is not possible to occur (e.g. region 224 in FIG. 10A). Alternatively, the valid region data may be calculated via other programming, and be imported at step 72 in its processed form such as that in image 220 in FIG. 10A, or image 278 in FIG. 15D.

At step 74, the routine initializes the Image_mass variable. In this step, Image_mass is equal to the total number of events.

At step 76, the routine initializes u. Representative code steps to perform this initialization may read as follows:

Let u(2:N−1, 2:M−1)=Events (i.e. the interior of u is equal to Events)
Let u(1, :)=u(2, :)
Let u(N, :)=u(N−1, :)
Let u(:, 1)=u(:, 2)
Let u(:, M)=u(:, M−1) (i.e. the boundary of u satisfies Neumann Boundary Conditions)

At step 78, the routine initializes div_theta. This step involves processing of the valid region data to generated vectors from the auxiliary data. Representative code steps to perform this initialization may read as follows.

```
eps = 1.0e−6
for i=1:N−2
    for j=2:M−2
        theta__x(i,j) = validRegion(i,j) − validRegion(i,j−1)
    end
    theta__x(i,1) = 0
end
for j=1:M−2
    for i=2:N−2
        theta__y(i,j) = validRegion(i,j) − validRegion(i−1,j)
    end
    theta__y(1,j) = 0
```

-continued

```
  end
  for i=1:N-2
    for j=1:M-2
      norm_theta = sqrt(theta_x(i,j)^2 + theta_y(i,j)^2 + eps)
      theta_x(i,j) = theta_x(i,j)/norm_theta
      theta_y(i,j) = theta_y(i,j)/norm_theta
    end
  end
  for i=1:N-2
    for j=1:M-3
      div_theta_x(i,j) =theta_x(i,j+1) – theta_x(i,j)
    end
    div_theta_x(i,M-2) = – theta_x(i,M-2)
  end
  for j=1:M-2
    for i=1:N-3
      div_theta_y(i,j) = theta_y(i+1,j) – theta_y(i,j)
    end
    div_theta_y(N-2,j) = – theta_y(N-2,j)
  end
  div_theta = div_theta_x + div_theta_y
```

Referring back to FIG. 2, the routine 40 then iteratively solves the modified TV MPLE equations 16-21. The first step in the iteration is to update the term u_interior at step 44. Representative code steps to perform this initialization may read as follows:

```
for y=1:(N-2)
  for x=1:(M-2)
    beta = alpha*(u(y+1,x) + u(y+1, x+2) + u(y, x+1) + u(y+2, x+1))
         – lambda*div_theta(y,x)
         – alpha*(d_x(y, x+1) – d_x(y, x) + d_y(y+1,x) – d_y(y, x))
         + alpha*(g_x(y, x+1) – g_x(y, x) + g_y(y+1,x) – g_y(y, x))
         + gamma*(1 – b – (mass – u(y+1, x+1)))
    temp_a = 4*alpha + gamma
    temp_c = mu*Events(y,x) / Image_mass
    u(y+1, x+1) = (beta + sqrt(beta^2 +4*temp_a*temp_c))/(2*temp_a)
  end
end
```

At step 46, the routine then updates the term u_boundary. This step ensures that the model satisfies the boundary conditions, (e.g. no density leaving the valid region of the image). Representative code steps to perform this initialization may read as follows:

Let u(1, :)=u(2, :)
Let u(N, :)=u(N–1, :)
Let u(:, 1)=u(:, 2)
Let u(:, M)=u(:, M–1)

At step 48, the routine updates the Mass term. Here, Mass is equal to the sum of u Interior. The routine then updates b at step 50, where b=b+(mass–1).

At step 52, the routine updates grad_u_x and grad_u_y using the following code steps.

```
  for i=1:N-2
    for j=1:M-1
      grad_u_x(i, j) = u(i+1, j+1) – u(i+1, j)
    end
  end
  for j=1:M-2
    for i=1:N-1
      grad_u_y(i, j) = u(i+1, j+1) – u(i, j+1)
    end
  end
```

At step 54, the d_x and d_y are updated; where:
d_x(i,j)=sign(grad_u_x(i,j)+g_x(i,j))*max(abs(grad_u_x(i,j)+g_x(i,j))–1/alpha, 0), and d_y(i,j)=sign(grad_u_y(i,j)+g_y(i,j))*max(abs(grad_u_y(i,j)+g_y(i,j))–1/alpha, 0).

At step 56, the routine updates g_x and g_y; where:
g_x=g_x+(grad_u_x–d_x), and g_y=g_y+(grad_u_y–d_y).

At step 58, the relative error (rel_error) is updated, where:
rel_error=sum((u–u_n)^2)/max(sum((u_n)^2), sum((u)^2))

Finally, u_n is updated (u_n=u) at step 60. The relative error is checked against a specified tolerance at step 62. If rel_error<TOL, the Interior of u_n (representing the probability density for the region of interest) is output at step 64. If not, the routine returns back to step 44 and repeats step 44 through step 62. The routine iterates through steps 44 through step 62 until rel_error<TOL.

b. Weighted $H_1$ Maximum Penalized Likelihood Estimation

Figure 4:
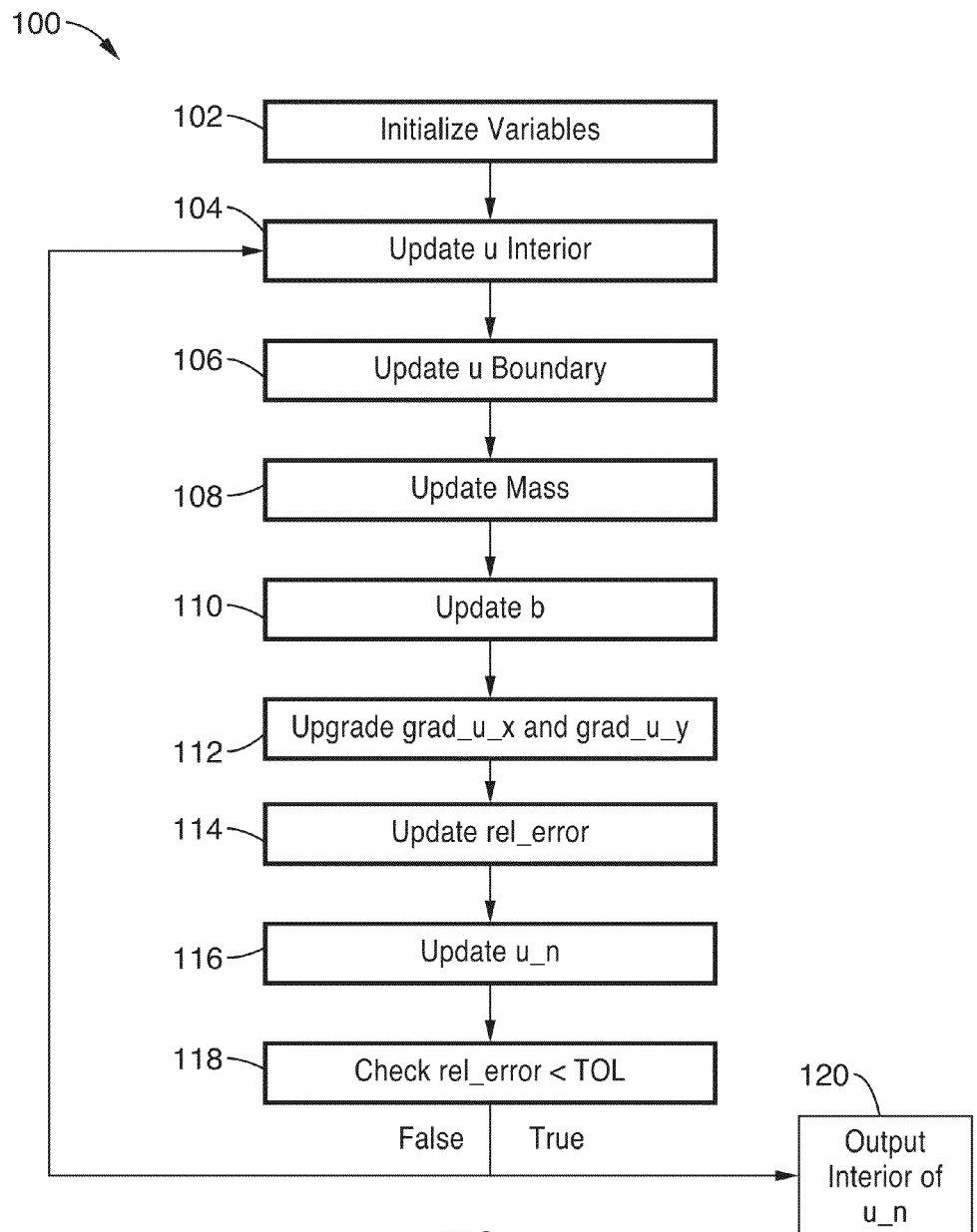
FIG. 4 shows a flow diagram for a method of performing density estimation using weighted $H_1$ MPLE in accordance with the present invention.
Figure 5:
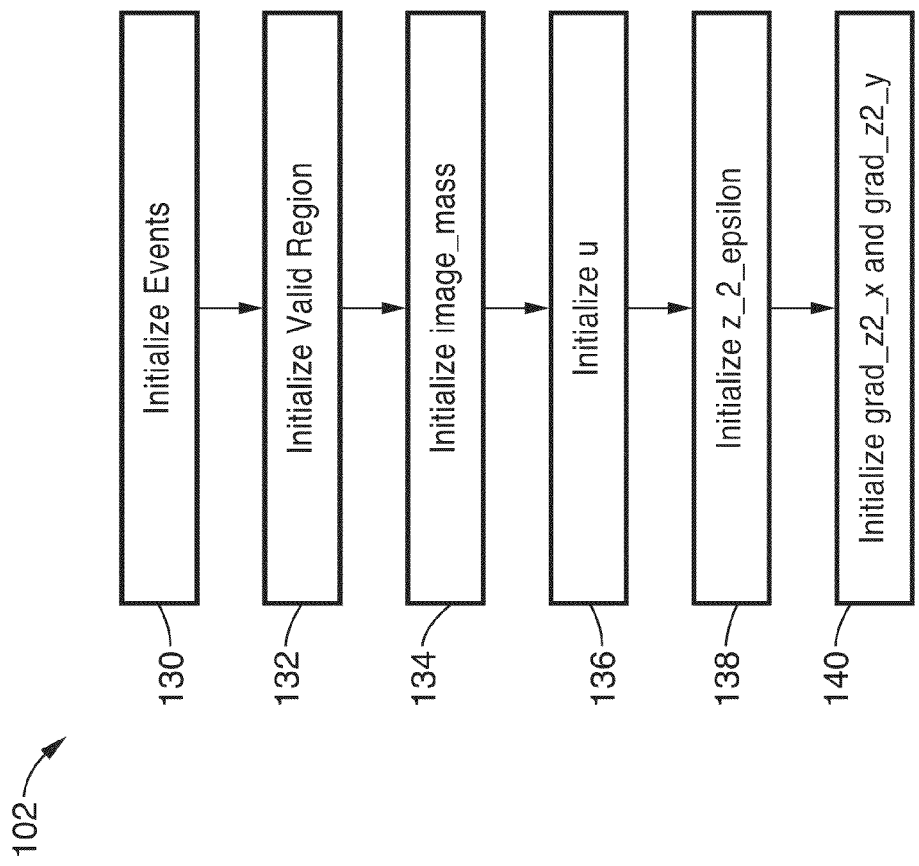
FIG. 5 illustrates the initialize variables step of the method shown in FIG. 3.

FIGS. 4 and 5 illustrate a method 100 for generating probability density data using Weighted $H_1$ Maximum Penalized Likelihood Estimation in accordance with the present invention.

At step 102, the routine initializes variables. Step 102 is shown in more detail in FIG. 5. The routine first initializes events at step 130. Here, Events(i,j) is the number of events that occurred in the region represented by grid element (i,j).

At step 132, the routine initializes the valid_region variable. The valid region data is input in the processed form such as that in image 220 in FIG. 10A, or image 278 in FIG. 15D. Step 132 may include routines that process the information, such as segmentation or other pre-proceeding described in FIGS. 9A though 9C for generating the valid region of FIG. 10A. In this step, we let valid Region(i,j) be equal to one (1) where an event can occur (e.g. region 222 in FIG. 10A), and zero where it is not possible to occur (e.g. region 224 in FIG. 10A). Alternatively, the valid region data may be calculated via other programming, and be imported at step 132 in its processed form such as that in image 220 in FIG. 10A, or image 278 in FIG. 15D. In this step, we let valid Region(i,j) be equal to one (1) where an event can occur and zero where it is not possible to occur.

At step 134, the routine initializes the Image_mass (Image_mass=the total number of events).

At step 136, the routine initializes u. Representative code steps to perform this initialization may read as follows:

Let u(2:N–1, 2:M–1)=Events (i.e. the interior of u is equal to Events)
Let u(1, :)=u(2, :)
Let u(N, :)=u(N–1, :)
Let u(:, 1)=u(:, 2)
Let u(:, M)=u(:, M–1) (i.e. the boundary of u satisfies Neumann Boundary Conditions).

At step 138, the routine initializes z_2_epsilon. The parameter epsilon as follows:

Let 0<delta<<1 (we chose 0.1).
Set z_2_epsilon(y,x)=1 if validRegion(y,x)=1 and the distance from (y,x) to the boundary of the valid region is >epsilon.
Set z_2_epsilon(y,x)=delta if validRegion(y,x)=0 and the distance from (y,x) to the boundary of the valid region is >epsilon.
Take z_2_epsilon(y,x) to be a smooth function in the region where (y,x) is less than epsilon units to the boundary of the valid region.

At step 140, the routine initializes grad_z2_x and grad_z2_y.

Representative code steps to perform this initialization may read as follows:

```
for i=1:N-2
   for j=2:M-3
      grad_z2_x(i, j) = (z_2_epsilon(i, j+1) - z_2_epsilon(i, j-1)) / 2
   end
   grad_z2_x(i, 1) = (z_2_epsilon(i, 2) - z_2_epsilon(i, 1)) / 2
   grad_z2_x(i, M-2) = (z_2_epsilon(i, M-2) - z_2_epsilon(i, M-3)) / 2
end
for j=1:M-2
   for i=2:N-3
      grad_z2_y(i, j) = (z_2_epsilon(i+1, j) - z_2_epsilon(i-1, j)) / 2
   end
   grad_z2_y(1, j) = (z_2_epsilon(2, j) - z_2_epsilon(1, j)) / 2
   grad_z2_y(N-2,j) = (z_2_epsilon(N-2, j) - z_2_epsilon(N-3, j)) / 2
End
```

Referring back to FIG. 4, the routine 100 then iteratively solves the Weighted $H_1$ Maximum Penalized Likelihood Estimation equations 11-14. The first step in the iteration is to update the term u_interior at step 104. Representative code steps to perform this initialization may read as follows:

```
for y=1:(N-2)
   for x=1:(M-2)
      alpha = z_2_epsilon(y,x)*(u(y+1,x) + u(y+1, x+2) + u(y, x+1) +
            u(y+2, x+1)) + grad_z2_x(y,x)*(u(y+1, x+2) - u(y+1, x))/2
            + grad_z2_y(y,x)*(u(y+2, x+1) - u(y, x+1))/2
            + gamma*(1 - b - (mass - u(y+1, x+1) ))
      temp_a = 4*z_2_epsilon(y,x) + gamma
      temp_c = mu*Events(y,x) / Image_mass
      u(y+1, x+1) = (alpha + sqrt(alpha^2 + 4*temp_a*temp_c)) /
            (2*temp_a)
   end
End
```

At step 106, the routine updates u_boundary. Representative code steps to perform this initialization may read as follows:
Let u(1, :)=u(2, :)
Let u(N, :)=u(N-1, :)
Let u(:, 1)=u(:, 2)
Let u(:, M)=u(:, M-1)

At step 108, the routine updates u Mass. Here, mass is equal to the sum of u Interior. The routine then updates b at step 110, where b=b+(mass-1).

At step 112, the routine updates grad_u_x and grad_u_y using the following code steps.

```
for i=1:N-2
   for j=1:M-1
      grad_u_x(i, j) = u(i+1, j+1) - u(i+1, j)
   end
end
for j=1:M-2
   for i=1:N-1
      grad_u_y(i, j) = u(i+1, j+1) - u(i, j+1)
   end
end
```

At step 114, the relative error is updated, where:
rel_error=sum((u-u_n)^2)/max(sum((u_n)^2), sum((u)^2))

Finally, u_n (u_n=u) is updated at step 116. The relative error is checked against a specified tolerance at step 118. If rel_error<TOL, the Interior of u_n (representing the probability density for the region of interest) is output at step 120. If not, the routine returns back to step 104 and repeats step 104 through step 118. The routine iterates through steps 104 through 118 until rel_error<TOL.

V. Results

The strengths of the above models were tested. The methods of the present invention were first compared to existing methods for a dense data set. The methods of the present invention were also shown to perform well for sparse data sets. An example with an aerial image and randomly selected events were tested to show how the methods of the present invention could be applied to geographic event data. Finally, probability density estimates for residential burglaries were tested using the methods of the present invention.

FIGS. 6A through 6H illustrate a series of images comparing the systems of the present invention against systems available in the art. FIG. 6A shows image 154 having two disks 152 located in the middle of the image. Disks 152 are representative of regions where events cannot occur (i.e. invalid regions). The area 150 outside disks 152 represents the valid regions (where events can occur). Image 156 in FIG. 6B shows the true density for the example. FIG. 6C illustrates an image 158 having 4,000 events that were selected randomly from the region outside the disks (true density) of FIG. 6B.

FIG. 6D illustrates an image 160 showing results using Kernel Density Estimation. With a variance of σ=2.5, FIG. 6D shows that the Kernel Density Estimation predicts that events may occur in the invalid region.

FIG. 6E illustrates an image 162 showing results using Maximum Penalized Likelihood Estimation based on Total Variation (TV MPLE). As seen in image 162, events are also predicted outside the valid region.

FIG. 6F illustrates an image 164 showing results using the modified TV MPLE method 40 of the present invention. FIG. 6G illustrates an image 166 showing results using the Weighted $H_1$ Maximum Penalized Likelihood Estimation method 100 in accordance with the present invention. FIG. 6H illustrates an image 168 showing results using the weighted TV MPLE method (incorporating elements of both methods 40 and 100) of the present invention. As shown in FIGS. 6F through 6H, events are predicted within the valid region 150, with little to no events predicted within the invalid regions 152.

In FIGS. 6B, and 6D through 6H, the color scale represents the relative probability of an event occurring in a given pixel. The images are 80 pixels by 80 pixels.

Referring now to FIGS. 7A through 7H, a predefined probability map with sharp gradients was used to validate the methods of the present invention. Image 170 of FIG. 7A shows a piecewise-constant true density. FIG. 7B shows image 176 having a disk 174 located in the middle of the image. Disk 174 is representative of a region where events cannot occur (i.e. an invalid region). The area 172 outside disk 174 represents the valid region (where events can occur).

FIG. 7C illustrates an image 178 having 8,000 events that were selected randomly from the region outside the disk (true density) of FIG. 7A. F Density estimates with the Gaussian Kernel Density Estimate and the Total Variation MPLE method were preformed.

FIG. 7D illustrates an image 180 showing results using Kernel Density Estimation. With a variance of σ=2, FIG. 7D shows that the Kernel Density Estimation predicts that events may occur in the invalid region.

FIG. 7E illustrates an image 182 showing results using Maximum Penalized Likelihood Estimation based on Total Variation (TV MPLE). As seen in image 182, events are also predicted outside the valid region.

FIG. 7F illustrates an image 184 showing density estimates using the modified TV MPLE method 40 of the present invention. FIG. 7G illustrates an image 186 showing density estimates using the Weighted $H_1$ Maximum Penalized Likelihood Estimation method 100 in accordance with the present invention. FIG. 7H illustrates an image 188 showing density estimates using the weighted TV MPLE method (incorporating elements of both methods 40 and 100) of the present invention.

As shown in FIGS. 7F through 7H, the methods of the present invention maintain the boundary of the invalid region 174 and appear close to the true solution. In addition, they keep the sharp gradient in the density estimate. The $L_2$ errors for these methods are located in Table 1, which lists the $L_2$ error comparison of the five methods shown in FIGS. 7A through 7H. As shown in Table 1, the methods of the present invention performed better than both the Kernel Density Estimation method and the TV MPLE method.

Crimes and other types of events may be quite sparse in a given geographical region. Consequently, it becomes difficult to determine the probability that an event will occur in the area. It is challenging for density estimation methods that do not incorporate the spatial information to distinguish between invalid regions and areas that have not had any crimes, but are still likely to have events.

Using the same predefined probability density from the introduction section in FIG. 6B, the methods of the present invention were shown to maintain these invalid regions for sparse data. Image 190 in FIG. 8A shows the true density for the example. FIG. 8B illustrates an image 192 having 40 events 194 that were selected randomly from the region outside the disks (true density) of FIG. 8A.

FIG. 8C illustrates an image 196 showing results using Gaussian Kernel Density Estimation. With a variance of σ=15, FIG. 8C shows that the Kernel Density Estimation predicts that events may occur in our invalid region.

FIG. 8D illustrates an image 198 showing results using Maximum Penalized Likelihood Estimation based on Total Variation (TV MPLE). As seen in image 198, events are also predicted outside the valid region.

FIG. 8E illustrates an image 200 showing density estimates using the modified TV MPLE method 40 of the present invention. FIG. 8F illustrates an image 202 showing density estimates using the Weighted $H_1$ Maximum Penalized Likelihood Estimation method 100 in accordance with the present invention. FIG. 8G illustrates an image 204 showing density estimates using the weighted TV MPLE method of the present invention.

As shown in FIGS. 8E through 8G, the methods of the present invention performed better than both the Kernel Density Estimation method and the TV MPLE method. For this sparse problem, our Weighted $H_1$ MPLE and Modified TV MPLE methods maintain the boundary of the invalid region and appear close to the true solution.

The $L_2$ errors for these methods are located in Table 2, which lists the $L_2$ error comparison of the five methods shown in FIGS. 8A through 8G. As shown in Table 1, the methods of the present invention Table 2 contains the $L_2$ errors for both the example of FIGS. 8A through 8G (40 events) and the example of FIGS. 6A through 6H (4,000 events). As shown in Table 2, the Modified TV and Weighted $H_1$ MPLE methods performed the best for both examples. The Weighted $H_1$ MPLE method was exceptionally better for the sparse data set. The Weighted TV MPLE method does not perform as well for sparse data sets and fails to keep the boundary of the valid region. Since the rest of the examples contain sparse data sets, the Weighted TV MPLE method was not tested for the remaining examples.

To test the models with external spatial data, a region of the Orange County coastline with clear invalid regions was obtained from Google Earth™. For the purposes of this example, it was determined to be impossible for events to occur in the ocean, rivers, or large parks located in the middle of the region.

FIG. 9A shows the initial aerial image 210 of the region to be considered. The region of interest is about 15.2 km by 10 km. Various segmentation methods may be used for selecting the valid region. For the present example, only data from the true color aerial image was available, not multispectral data. To obtain the valid and invalid regions, the "texture" (i.e. fine detailed features such as large buildings) from image 210 was removed.

Figure 9B:
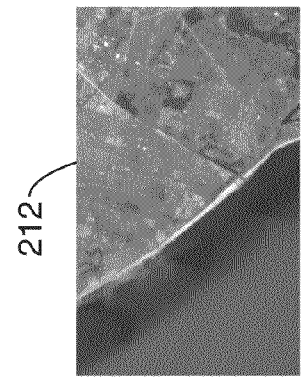
FIG. 9B shows a denoised image processed from the image of FIG. 9A.

The resulting denoised version of the initial image, shown as image 212 in FIG. 9B, still contains detailed regions obtained from large features, such as large buildings. It is desirable to remove these and maintain prominent regional boundaries. Therefore, the next step is to smooth away from regions of large discontinuities.

Figure 9C:
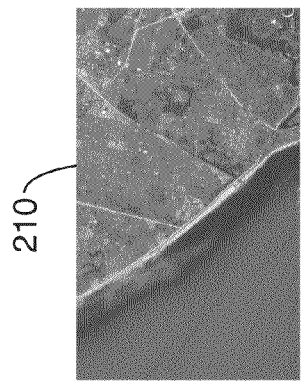
FIG. 9C shows smoothed-away image processed from the image of FIG. 9B.

The smoothed-away and denoised image 214 is shown in FIG. 9C. Since oceans, rivers, parks, and other such areas have generally lower intensity values than other regions, thresholding is used to find the boundary between the valid and invalid regions.

It is appreciated that other methods may also be used for determining the valid region. For example, one approach may be to evolve the edge set of the valid region using Γ-convergence. Since this technique can be used for many types of event data, including residential burglaries, this may be applied to other types of events such as Iraq Body Count Data.

It is also appreciated that the "invalid region" may also comprise a region that includes events that are of lesser interest and therefore desired to be excluded from being populated with non-zero density estimates. This "lesser interest region" may be applied in the same fashion as the "valid region" in the examples contained herein.

Figure 10A:
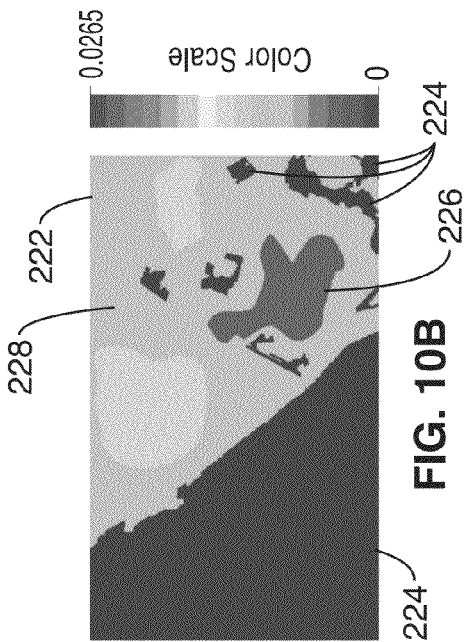
FIG. 10A illustrates an image showing the valid region obtained from the image of FIG. 9C.

After thresholding the intensity values of FIG. 9C, image 220 of the Orange County Coastline was obtained, as shown in FIG. 10A. Image 220 contains valid region 222 (shown white) and invalid regions 224 (e.g. ocean, lakes, rivers etc., shown black).

Figure 10B:
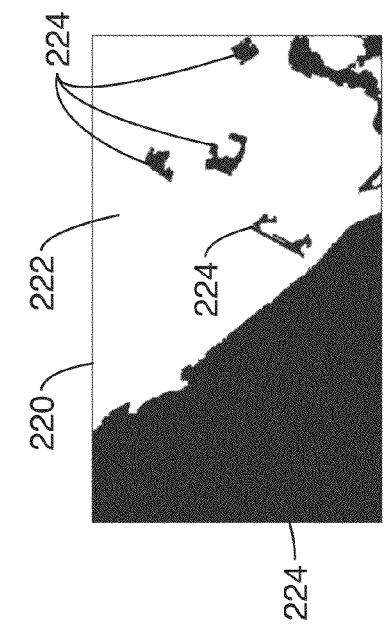
FIG. 10B illustrates the image of FIG. 10A populated with a density map.

As shown in FIG. 10B, a probability density image 220 was then constructed with probability density data 226 disposed within valid region 222. A toy density map 228 was constructed from the valid region 222 to represent the probability density for the example and to generate data. The color scale represents the relative probability of an event occurring per square kilometer. Regions with colors farther to the right on the color scale are more likely to have events.

FIGS. 11A through 11C show images 240, 242, and 244 having distinct data sets of 200, 2,000 and 20,000 selected events respectively, chosen from the density map 228 of FIG. 10B.

For each set of events in FIGS. 11A through 11C, three probability density estimations were generated for comparison: the Gaussian Kernel Density Estimate, Modified Total Variation MPLE model, and Weighted $H_1$ MPLE model.

FIGS. 12A through 12C show images 250, 252, and 254 that are the Gaussian Kernel Density estimates for 200, 2,000, and 20,000 sampled events of the Orange County Coastline image of FIG. 10B. The standard deviation σ of the Gaussians are 35, 18 and 6.25 for FIGS. 12A, 12B and 12C respectively.

As seen in FIGS. 12A through 12C, summing up Gaussian distributions gives a smooth density estimate. In all of these images, a nonzero density is estimated in the invalid region.

Figure 13A:
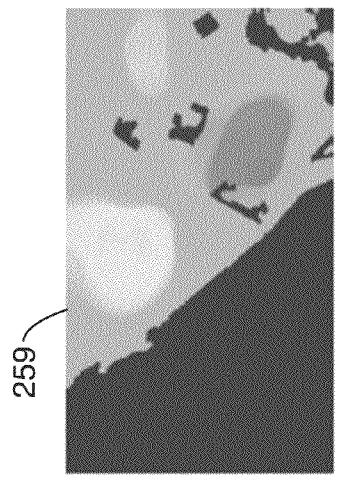
FIGS. 13A through 13C illustrate images showing estimates for 200, 2,000, and 20,000 sampled events of the Orange County Coastline image of FIG. 10B generated from the Modified Total Variation MPLE method with the boundary edge aligning term in accordance with the present invention.
Figure 13B:
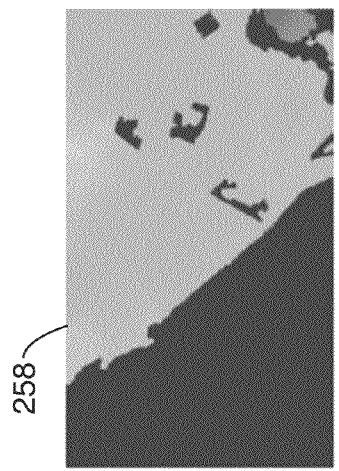
Figure 13C:
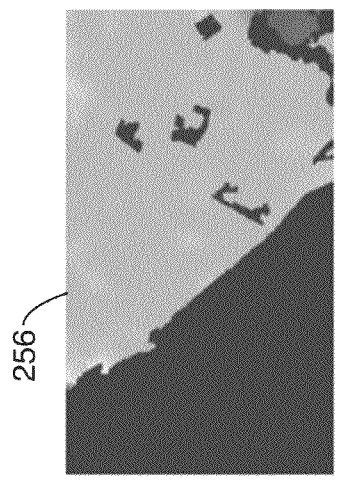

FIGS. 13A through 13C illustrate images 256, 258, and 259 showing estimates for 200, 2,000, and 20,000 sampled events of the Orange County Coastline image of FIG. 10B generated from the Modified Total Variation MPLE method with the boundary edge aligning term in accordance with the present invention.

The parameter for $\lambda$ should be sufficiently large in the modified TV MPLE method in order to prevent the diffusion of the density into the invalid region. In doing so, the boundary of the valid region may attain density values too large in comparison to the rest of the image when the size of the image is very large. To remedy this, the resulting image from the routine may be taken, the boundary of the valid region set to zero, and the image rescaled to have a sum of one. The invalid region in this case sometimes has a very small non-zero estimate. For visualization purposes this has been set to zero. However, it is noted that the modified TV MPLE method has the strength that density does not diffuse through small sections of the invalid region back into the valid region on the opposite side. Events on one side of an object, such as a lake or river, should not necessarily predict events on the other side.

Figure 14A:
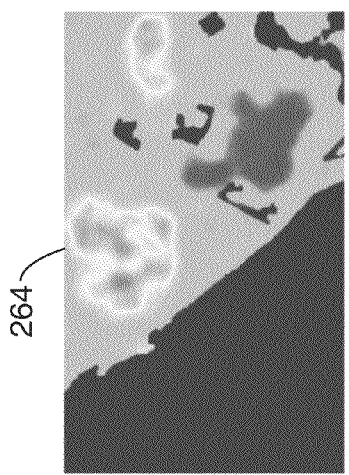
FIGS. 14A through 14C illustrate images showing estimates for 200, 2,000, and 20,000 sampled events of the Orange County Coastline image of FIG. 10B generated from the Weighted $H_1$ MPLE method of the present invention.
Figure 14B:
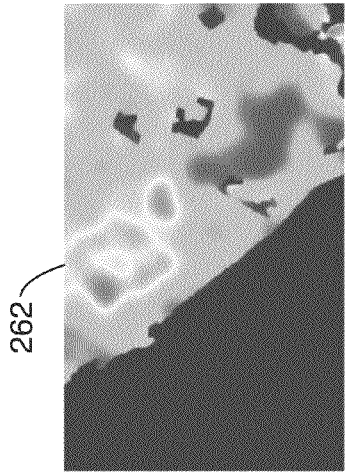
Figure 14C:
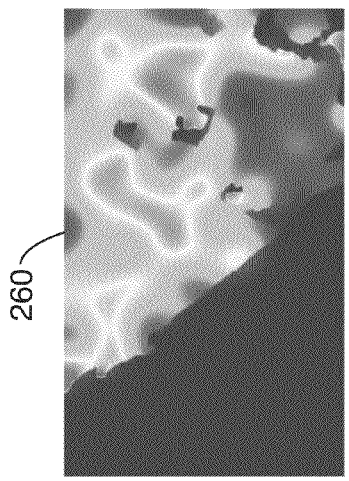

FIGS. 14A through 14C illustrate images 260, 262, and 264 showing estimates for 200, 2,000, and 20,000 sampled events of the Orange County Coastline image of FIG. 10B generated from the Weighted $H_1$ MPLE method of the present invention. This method does very well for the sparse data sets of 200 and 2,000 events.

A significant difference is noted for the invalid regions when generated with the models of the present invention as compared to the Kernel Density Estimation model. The density estimates obtained from using the models of the present invention have a clear improvement in maintaining the boundary of the valid region. To determine how these models did in comparison to one another and to the Kernel Density Estimate, the $L_2$ errors were calculated and listed in Table 3.

The models of the present invention consistently outperform the Kernel Density Estimation model. The Weighted $H_1$ MPLE method performs the best for the 2,000 and 20,000 events and visually appears closer to the true solution for the 200 events than the other methods. Qualitatively, it is noted that with sparse data, the modified TV penalty functional gives results which are near constant. Thus, it gives a good $L_2$ error for the Orange County Coastline example of FIG. 10A/10B, which has piecewise-constant true density, but gives a worse result for the sparse data example of FIG. 8A, where the true density has a nonzero gradient. Even though the Modified TV MPLE method has a lower $L_2$ error in the Orange County Coastline example of FIG. 10B, the density estimation does not give a good indication of regions of high and low likelihood.

Figure 15B:
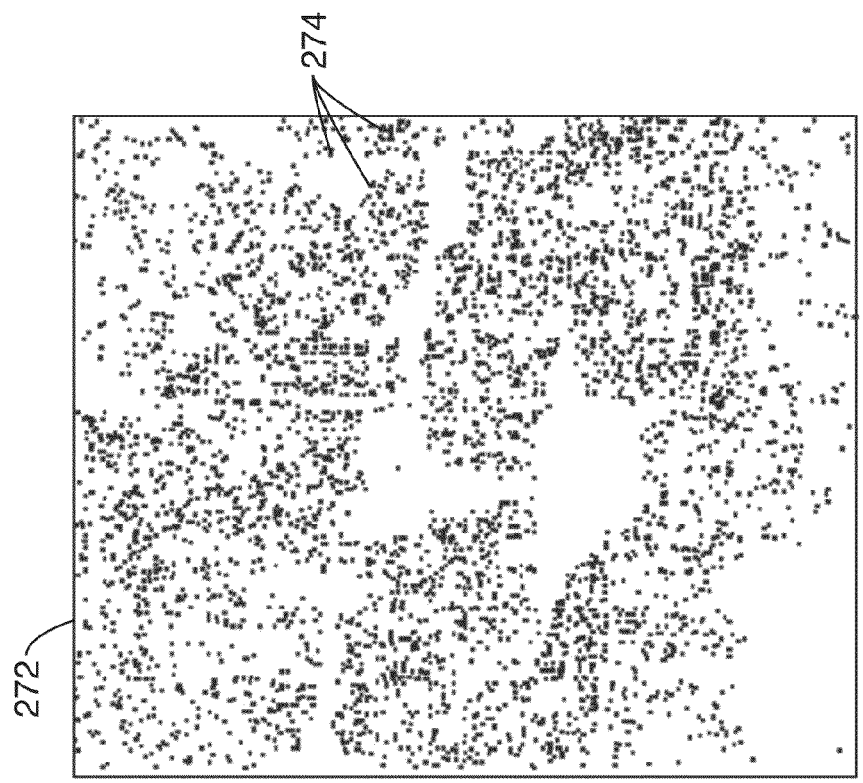
FIG. 15B is an image showing event data comprising locations of 4,487 burglaries that occurred in the region of interest in FIG. 15A.
Figure 15A:
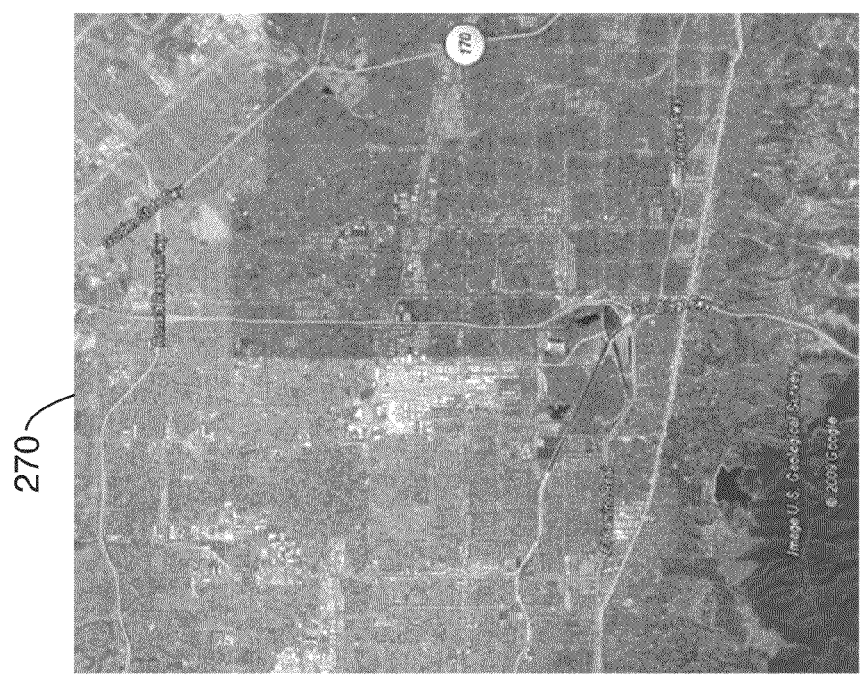
FIG. 15A is an aerial image of the region interest in the San Fernando Valley.

FIGS. 15A through 16D show an example using actual residential burglary information from the San Fernando Valley in Los Angeles. FIG. 15A is an aerial image 270 of the region interest, which is about 16 km by 18 km. The aerial image 270 was obtained using Google Earth™. FIG. 15B is an image 272 showing event data 274 comprising locations of 4,487 burglaries that occurred in the region during 2004 and 2005. It is assumed that residential burglaries cannot occur in large parks, lakes, mountainous areas without houses, at airports, and industrial areas.

Rather than use the aerial image data to generate the valid region as done in the previous example, the current example uses other data, such as census data. Using census or other types of data, housing density information for a given region can be calculated. FIG. 15C shows an image 276 comprising the housing density for the San Fernando Valley.

Figure 15D:
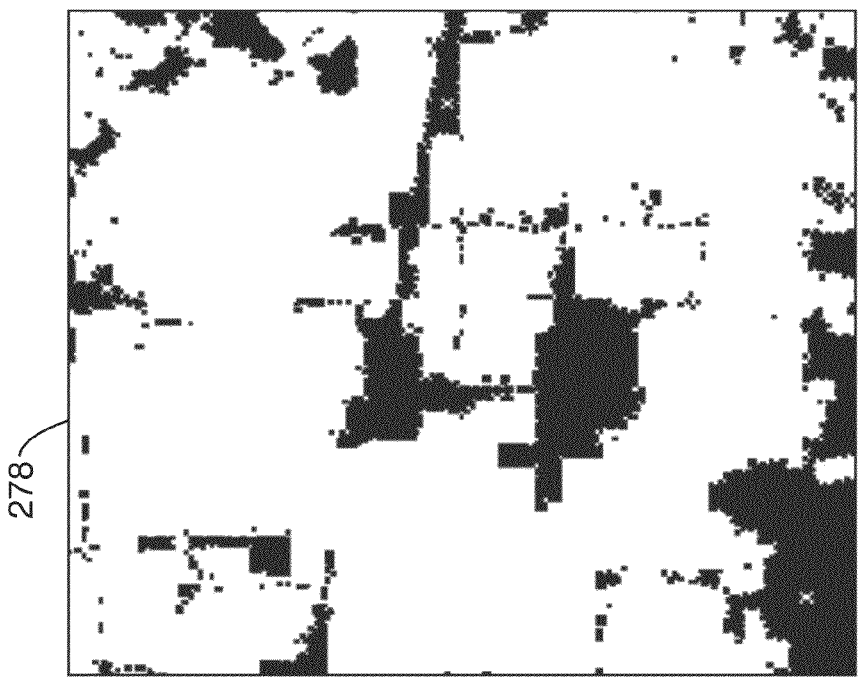
FIG. 15D is an image showing the valid region obtained from the housing density in FIG. 15C.
Figure 15C:
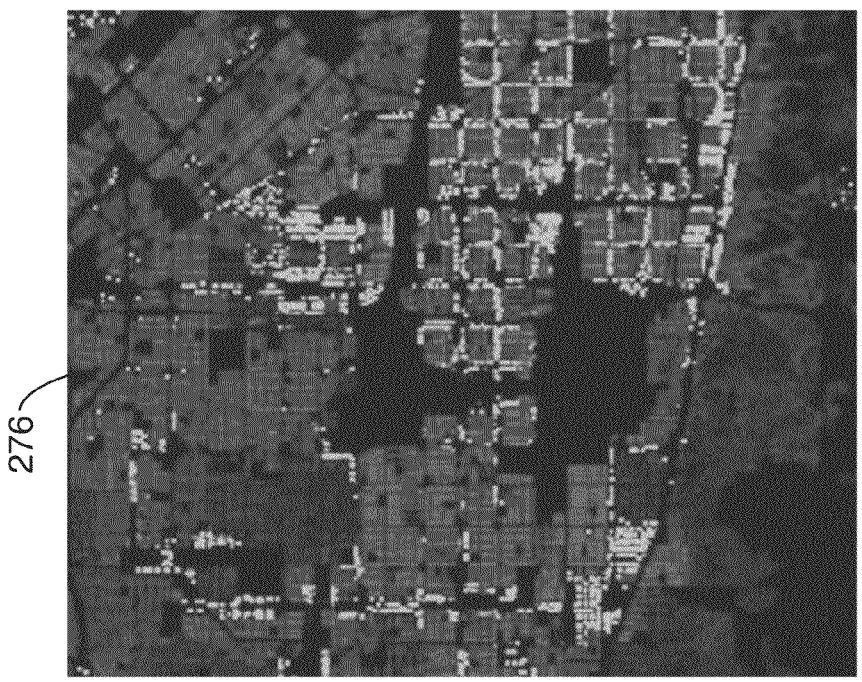
FIG. 15C shows an image comprising the housing density for the San Fernando Valley for the example of FIGS. 15A through 15C.

FIG. 15D is an image 278 showing the valid region obtained from the housing density in FIG. 15C. The image 276 of FIG. 15C is pre-processed to generate the valid region of FIG. 15D. Housing density provides the exact locations of where residential burglaries may occur. However, the methods of the present invention prohibit the density estimates from spreading through the boundaries of the valid region. If the image 276 of FIG. 15C were to be used directly as the valid region, then crimes on one side of a street will not have an effect on the opposite side of the road. Therefore, small holes and streets in the in the housing density image are filled in to generate the image 278 in FIG. 15D as the valid region.

Figure 16B:
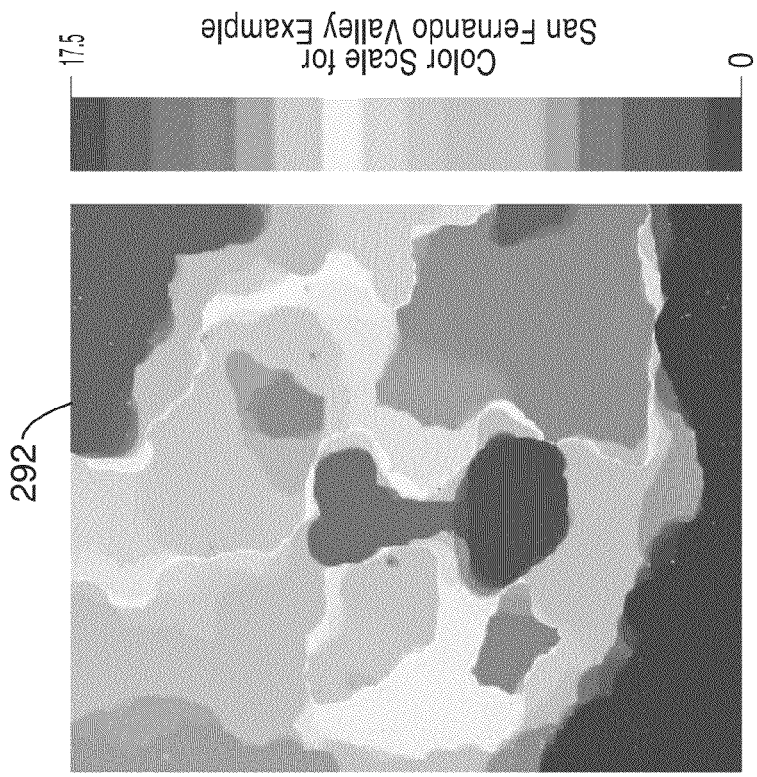
FIG. 16B shows density estimates for the San Fernando Valley residential burglary data of FIG. 15B TV MPLE.
Figure 16A:
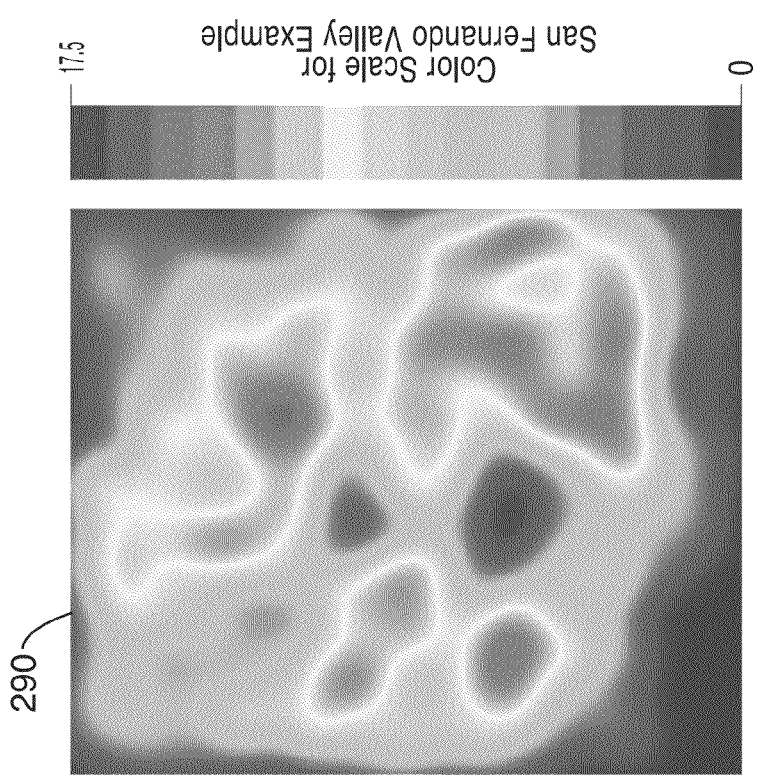
FIG. 16A shows density estimates for the San Fernando Valley residential burglary data of FIG. 15B using Kernel Density Estimation.
Figure 16D:
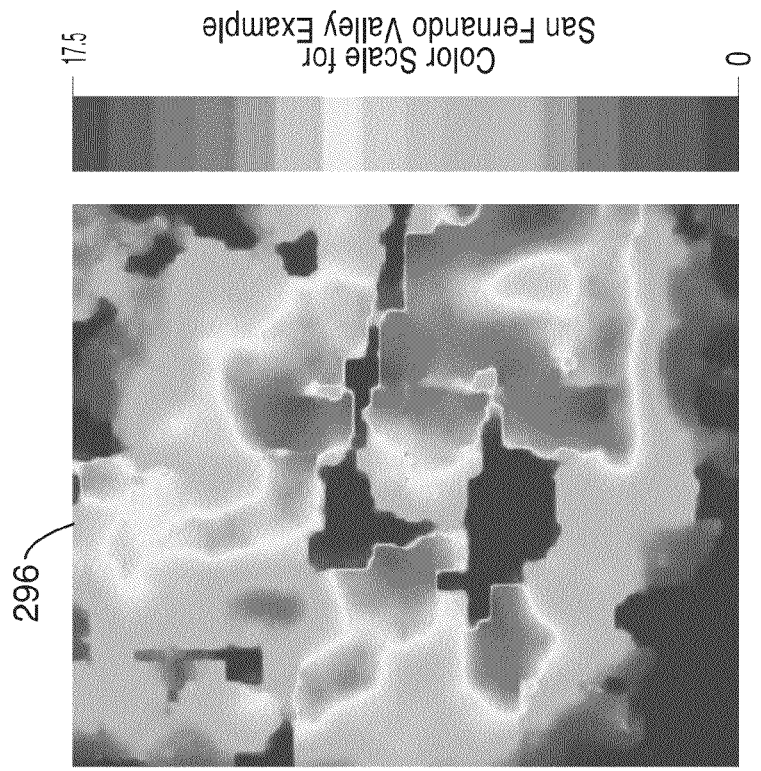
FIG. 16D shows density estimates for the San Fernando Valley residential burglary data of FIG. 15B using the Weighted $H_1$ MPLE method of the present invention, incorporating the auxiliary census block data of FIGS. 15C and 15D as the valid region.
Figure 16C:
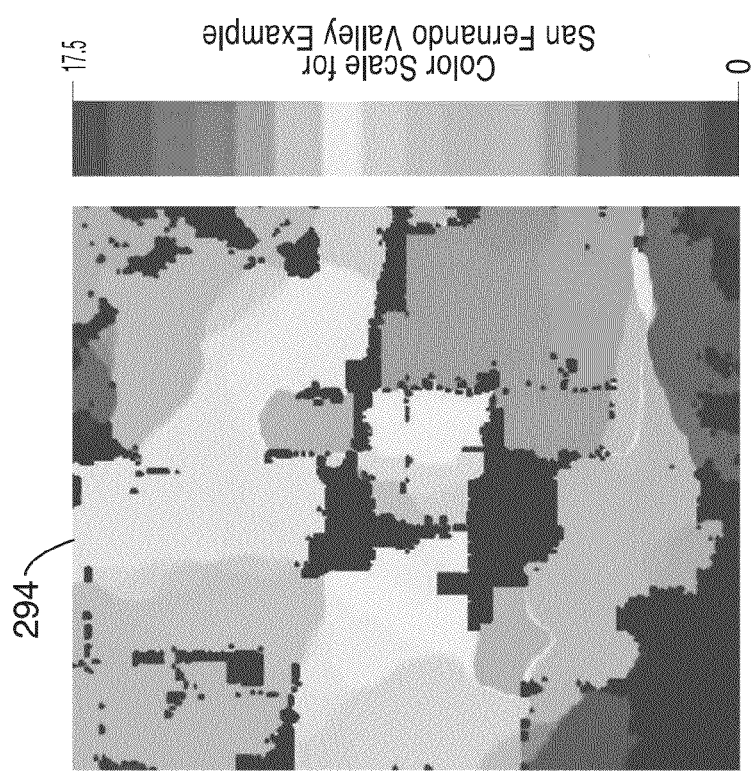
FIG. 16C shows density estimates for the San Fernando Valley residential burglary data of FIG. 15B using the Modified TV MPLE method of the present invention, incorporating the auxiliary census block data of FIGS. 15C and 15D as the valid region.

The Weighted $H_1$ MPLE and Modified TV MPLE models were compared against the Gaussian Kernel Density Estimate (variance $\sigma=21$), and the TV MPLE method, resulting in the density estimations shown in FIG. 16A through 16C.

FIG. 16A shows density estimates 290 for the San Fernando Valley residential burglary data of FIG. 15B using Kernel Density Estimation. FIG. 16B shows density estimates 292 for the San Fernando Valley residential burglary data of FIG. 15B TV MPLE. FIG. 16C shows density estimates 294 for the San Fernando Valley residential burglary data of FIG. 15B using the Modified TV MPLE method of the present invention, incorporating the auxiliary census block data of FIGS. 15C and 15D as the valid region. FIG. 16D shows density estimates 296 for the San Fernando Valley residential burglary data of FIG. 15B using the Weighted $H_1$ MPLE method of the present invention, incorporating the auxiliary census block data of FIGS. 15C and 15D as the valid region. The color scale represents the number of residential burglaries per year per square kilometer.

It is interesting to note that there appears to be a relationship in the ratio between the number of samples and the size of the grid. In fact, each model has shown very different behavior in this respect. The TV based methods appear to be very sensitive to large changes in this ratio, whereas the $H_1$ method seems to be robust to these same changes.

The methods of the present invention may further be adapted to handle possible errors in the data, such as incorrect positioning of events that place them in the invalid region, by considering a probabilistic model of their position.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

From the discussion above it will be appreciated that the invention can be embodied in various ways, including the following:

1. A system for generating a probability density to estimate the probability that an event will occur in a region of interest, comprising: a processor; programming executable on said processor for: inputting spatial event data comprising one or more events occurring in the region of interest; inputting auxiliary data related to the region of interest; wherein the auxiliary data comprising non-event data having spatial resolution; and calculating a probability density estimate for the region of interest based on a function of the auxiliary data and the event data.

2. The system of embodiment 1, wherein the auxiliary data is used to generate a penalty functional to calculate the probability density estimate.

3. The system of embodiment 2: wherein the auxiliary data comprises spatial data defining a valid region where the one or more events are to occur and an invalid region where events are not to occur; and wherein the penalty functional is configured to generate a probability density map within the region of interest that restricts population of non-zero density estimates in the invalid region.

4. The system of embodiment 3, wherein the penalty functional comprises a total variation (TV) functional.

5. The system of embodiment 3, wherein the penalty functional comprises a $H_1$ Sobolev functional.

6. The system of embodiment 4: wherein the a probability density estimate is calculated according to the equation:

$$\hat{u}(x) = \operatorname{argmin}_{\int_\Omega u\, dx=1, 0\le u} \left\{ \int_\Omega |\nabla u|\, dx + \lambda \int_\Omega u \nabla \cdot \theta\, dx - \mu \sum_{i=1}^n \log(u(x_i)) \right\};$$

wherein u(x) is the desired probability density for x ∈ R²; wherein the known location of events occur at $x_1, x_2, \ldots, x_n$; wherein μ corresponds to weighting of maximum likelihood compared to the penalty functional; wherein $$\theta = \frac{\nabla(1_D)}{|\nabla(1_D)|_\varepsilon};$$

and wherein ($1_D$) is a characteristic function of the valid region.

7. The system of embodiment 5: wherein the a probability density estimate is calculated according to the equation:

$$\hat{u}(x) = \operatorname{argmin}_{\int_\Omega u\, dx=1, 0\le u} \left\{ \frac{1}{2} \int_\Omega z_\varepsilon^2 |\nabla u|^2\, dx - \mu \sum_{i=1}^n \log(u(x_i)) \right\};$$

wherein u(x) is the desired probability density for x ∈ R²; wherein the known location of events occur at $x_1, x_2, \ldots, x_n$; wherein μ corresponds to weighting of maximum likelihood compared to the penalty functional; and wherein $z_\varepsilon \to (1-\delta(\partial D))$.

8. The system of embodiment 2, wherein the auxiliary data comprises geographical data.

9. The system of embodiment 8, wherein the auxiliary data comprises geographican aerial image of the region of interest.

10. The system of embodiment 2, wherein the auxiliary data comprises census data relating to the region of interest.

11. A system for generating a probability density map of a region of interest, comprising: a processor; programming executable on said processor for: inputting spatial event data comprising one or more events occurring in the region of interest; inputting auxiliary data related to the region of interest; wherein the auxiliary data comprising non-event data having spatial resolution; calculating a probability density estimations for the region of interest based on a function of the auxiliary data and the event data; and generating a probability density map of the region of interest.

12. The system of embodiment 11, wherein the auxiliary data is used to generate a penalty functional to calculate the probability density estimate.

13. The system of embodiment 12: wherein the auxiliary data comprises spatial data defining a valid region where the one or more events are to occur and an invalid or lesser interest region where events are not to occur; and wherein the penalty functional is configured to restrict population of non-zero density estimates in the or lesser interest or invalid region of the probability density map.

14. The system of embodiment 13, wherein the penalty functional comprises a total variation (TV) functional.

15. The system of embodiment 13, wherein the penalty functional comprises a $H_1$ Sobolev functional.

16. The system of embodiment 14: wherein the a probability density estimate is calculated according to the equation:

$$\hat{u}(x) = \operatorname{argmin}_{\int_\Omega u\, dx=1, 0\le u} \left\{ \int_\Omega |\nabla u|\, dx + \lambda \int_\Omega u \nabla \cdot \theta\, dx - \mu \sum_{i=1}^n \log(u(x_i)) \right\};$$

wherein u(x) is the desired probability density for x ∈ R²; wherein the known location of events occur at $x_1, x_2, \ldots, x_n$; wherein μ corresponds to weighting of maximum likelihood compared to the penalty functional; wherein $$\theta = \frac{\nabla(1_D)}{|\nabla(1_D)|_\varepsilon};$$

and wherein ($1_D$) is a characteristic function of the valid region.

17. The system of embodiment 15: wherein the a probability density estimate is calculated according to the equation:

$$\hat{u}(x) = \operatorname{argmin}_{\int_\Omega u\,dx=1, 0\le u}\left\{\frac{1}{2}\int_\Omega z_\epsilon^2|\nabla u|^2\,dx - \mu\sum_{i=1}^n \log(u(x_i))\right\};$$

wherein $u(x)$ is the desired probability density for $x \in R^2$; wherein the known location of events occur at $x_1, x_2, \ldots, x_n$; wherein $\mu$ corresponds to weighting of maximum likelihood compared to the penalty functional; and wherein $z_\epsilon \to (1-\delta(\partial D))$.

18. The system of embodiment 12, wherein the auxiliary data comprises geographical data.

19. The system of embodiment 18, wherein the auxiliary data comprises an aerial image of the region of interest.

20. The system of embodiment 12, wherein the auxiliary data comprises census data relating to the region of interest.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

| Model | 8,000 Events |
|---|---|
| Kernel Density Estimate | 8.1079e−6 |
| TV MPLE | 6.6155e−6 |
| Modified TV MPLE | 4.1213e−6 |
| Weighted $H_1$ MPLE | 3.8775e−6 |
| Weighted TV MPLE | 4.3195e−6 |

TABLE 2

| Model | 40 Events | 4,000 Events |
|---|---|---|
| Kernel Density Estimate | 2.3060e−5 | 7.3937e−6 |
| TV MPLE | 2.5347e−5 | 7.7628e−6 |
| Modified TV MPLE | 1.4345e−5 | 5.7996e−7 |
| Weighted $H_1$ MPLE | 3.8449e−6 | 2.1823e−6 |
| Weighted TV MPLE | 1.5982e−5 | 3.6179e−6 |

TABLE 3

| Model | 200 Events | 2,000 Events | 20,000 Events |
|---|---|---|---|
| Kernel Density Estimate | 7.0338e−7 | 2.8847e−7 | 1.5825e−7 |
| Modified TV MPLE | 3.0796e−7 | 2.6594e−7 | 8.9353e−8 |
| Weighted $H_1$ MPLE | 5.4658e−7 | 1.5988e−7 | 5.8038e−8 |

What is claimed is:

1. A system for generating a probability density to estimate the probability that an event will occur in a region of interest, comprising:
    a processor;
    programming executable on said processor for:
        inputting spatial event data comprising one or more events occurring in the region of interest;
        inputting auxiliary data related to the region of interest;
        wherein the auxiliary data comprises non-event data having spatial resolution;
        wherein the auxiliary data comprises spatial data defining a valid region where the one or more events are to occur and an invalid region where events are not to occur;
        calculating a probability density estimate for the region of interest based on a function of the auxiliary data and the event data;
        wherein the probability density estimate is calculated using a Maximum Penalized Likelihood Estimation (MPLE) model;
        wherein said MPLE model comprises a penalty functional that encodes the auxiliary data in populating a valid region of said probability density estimate;
        wherein the penalty functional is configured to generate a probability density map within the region of interest that smoothes data in the valid region and minimizes non-zero density estimates in the invalid region;
        wherein the penalty functional comprises a $H_1$ Sobolev functional.

2. A system for generating a probability density to estimate the probability that an event will occur in a region of interest, comprising:
    a processor;
    programming executable on said processor for:
        inputting spatial event data comprising one or more events occurring in the region of interest;
        inputting auxiliary data related to the region of interest;
        wherein the auxiliary data comprises non-event data having spatial resolution;
        wherein the auxiliary data comprises spatial data defining a valid region where the one or more events are to occur and an invalid region where events are not to occur;
        calculating a probability density estimate for the region of interest based on a function of the auxiliary data and the event data;
        wherein the probability density estimate is calculated using a Maximum Penalized Likelihood Estimation (MPLE) model;
        wherein said MPLE model comprises a penalty functional that encodes the auxiliary data in populating a valid region of said probability density estimate;
        wherein the penalty functional is configured to generate a probability density map within the region of interest that smoothes data in the valid region and minimizes non-zero density estimates in the invalid region;
        wherein the penalty functional comprises a total variation (TV) functional;

and
wherein the probability density estimate is calculated according to the equation:

$$\hat{u}(x) = \mathrm{argmin}_{\int_\Omega u\,dx=1, 0\leq u}\left\{\int_\Omega |\nabla u|\,dx + \lambda\int_\Omega u\nabla\cdot\theta\,dx - \mu\sum_{i=1}^n \log(u(x_i))\right\};$$

wherein u(x) is the desired probability density for x ∈ R²,
wherein the known location of events occur at $x_1, x_2, \ldots, x_n$;
wherein μ corresponds to weighting of maximum likelihood compared to the penalty functional;
wherein $$\theta = \frac{\nabla(1_D)}{|\nabla(1_D)|_\varepsilon};$$

and
wherein ($1_D$) is a characteristic function of the valid region.

3. A system as recited in claim 1:
wherein the probability density estimate is calculated according to the equation:

$$\hat{u}(x) = \mathrm{argmin}_{\int_\Omega u\,dx=1, 0\leq u}\left\{\frac{1}{2}\int_\Omega z_\varepsilon^2|\nabla u|^2\,dx - \mu\sum_{i=1}^n \log(u(x_i))\right\};$$

wherein u(x) is the desired probability density for x ∈ R²;
wherein the known location of events occur at $x_1, x_2, \ldots, x_n$;
wherein μ corresponds to weighting of maximum likelihood compared to the penalty functional; and
wherein $z_\varepsilon \to (1-\delta(\partial D))$.

4. A system as recited in claim 1 or 2, wherein the auxiliary data comprises geographical data.

5. A system as recited in claim 4, wherein the auxiliary data comprises geographical aerial image of the region of interest.

6. A system as recited in claim 1 or 2, wherein the auxiliary data comprises census data relating to the region of interest.

7. A system for generating a probability density map of a region of interest, comprising:
a processor;
programming executable on said processor for:
 inputting spatial event data comprising one or more events occurring in the region of interest;
 inputting auxiliary data related to the region of interest;
 wherein the auxiliary data comprises non-event data having spatial resolution defining a valid region where the one or more events are to occur and an invalid region where events are not to occur;
 calculating a probability density estimate for the region of interest based on a function of the auxiliary data and the event data;
 wherein the probability density estimate is calculated using a Maximum Penalized Likelihood Estimation (MPLE) model;
 wherein said MPLE model comprises a penalty functional that encodes the auxiliary data in populating a valid region of said probability density estimate;
 generating a probability density map of the region of interest corresponding to said probability density estimate;
 wherein the penalty functional is configured to smooth data in the valid region and minimize non-zero density estimates in the invalid region of the probability density map; and
 wherein the penalty functional comprises a $H_1$ Sobolev functional.

8. A system for generating a probability density map of a region of interest, comprising:
a processor;
programming executable on said processor for:
 inputting spatial event data comprising one or more events occurring in the region of interest;
 inputting auxiliary data related to the region of interest;
 wherein the auxiliary data comprises non-event data having spatial resolution defining a valid region where the one or more events are to occur and an invalid region where events are not to occur;
 calculating a probability density estimate for the region of interest based on a function of the auxiliary data and the event data;
 wherein the probability density estimate is calculated using a Maximum Penalized Likelihood Estimation (MPLE) model;
 wherein said MPLE model comprises a penalty functional that encodes the auxiliary data in populating a valid region of said probability density estimate;
 generating a probability density map of the region of interest corresponding to said probability density estimate;
 wherein the penalty functional is configured to smooth data in the valid region and minimize non-zero density estimates in the invalid region of the probability density map;
 wherein the penalty functional comprises a total variation (TV) functional;
and
 wherein the probability density estimate is calculated according to the equation:

$$\hat{u}(x) = \mathrm{argmin}_{\int_\Omega u\,dx=1, 0\leq u}\left\{\int_\Omega |\nabla u|\,dx + \lambda\int_\Omega u\nabla\cdot\theta\,dx - \mu\sum_{i=1}^n \log(u(x_i))\right\};$$

wherein u(x) is the desired probability density for x ∈ R²;
wherein the known location of events occur at $x_1, x_2, \ldots, x_n$;
wherein μ corresponds to weighting of maximum likelihood compared to the penalty functional;
wherein $$\theta = \frac{\nabla(1_D)}{|\nabla(1_D)|_\varepsilon};$$

and
wherein ($1_D$) is a characteristic function of the valid region.

9. A system as recited in claim 7:
wherein the probability density estimate is calculated according to the equation:

$$\hat{u}(x) = \mathrm{argmin}_{\int_\Omega u\,dx=1, 0\leq u}\left\{\frac{1}{2}\int_\Omega z_\varepsilon^2|\nabla u|^2\,dx - \mu\sum_{i=1}^n \log(u(x_i))\right\};$$

wherein u(x) is the desired probability density for $x \in R^2$;
wherein the known location of events occur at $x_1, x_2, \ldots, x_n$;
wherein μ corresponds to weighting of maximum likelihood compared to the penalty functional; and
wherein $z_\epsilon \rightarrow (1-\delta(\partial D))$.

10. A system as recited in claim 7 or 8, wherein the auxiliary data comprises geographical data.

11. A system as recited in claim 10, wherein the auxiliary data comprises an aerial image of the region of interest.

12. A system as recited in claim 7 or 8, wherein the auxiliary data comprises census data relating to the region of interest.

13. A system for generating a probability density to estimate the probability that an event will occur in a region of interest, comprising:
   a processor;
   programming executable on said processor for:
      inputting spatial event data comprising one or more events occurring in the region of interest;
      inputting auxiliary data related to the region of interest;
      wherein the auxiliary data comprising non-event data having spatial resolution; and
      calculating a probability density estimate for the region of interest based on a function of the auxiliary data and the event data;
      wherein the auxiliary data is used to generate a penalty functional to calculate the probability density estimate;
      wherein the auxiliary data comprises spatial data defining a valid region where the one or more events are to occur and an invalid region where events are not to occur;
      wherein the penalty functional is configured to generate a probability density map within the region of interest that restricts population of non-zero density estimates in the invalid region;
      wherein the penalty functional comprises a total variation (TV) functional;
   wherein the a probability density estimate is calculated according to the equation:

$$\hat{u}(x) = \operatorname{argmin}_{\int_\Omega u dx = 1, 0 \le u} \left\{ \int_\Omega |\nabla u| \, dx + \lambda \int_\Omega u \nabla \cdot \theta \, dx - \mu \sum_{i=1}^n \log(u(x_i)) \right\};$$

wherein u(x) is the desired probability density for $x \in R^2$,
wherein the known location of events occur at $x_1, x_2, \ldots, x_n$;
wherein μ corresponds to weighting of maximum likelihood compared to the penalty functional;
wherein $$\theta = \frac{\nabla(1_D)}{|\nabla(1_D)|_\epsilon};$$

and
wherein ($1_D$) is a characteristic function of the valid region.

14. A system for generating a probability density to estimate the probability that an event will occur in a region of interest, comprising:
   a processor;
   programming executable on said processor for:
      inputting spatial event data comprising one or more events occurring in the region of interest;
      inputting auxiliary data related to the region of interest;
      wherein the auxiliary data comprising non-event data having spatial resolution; and
      calculating a probability density estimate for the region of interest based on a function of the auxiliary data and the event data;
      wherein the auxiliary data is used to generate a penalty functional to calculate the probability density estimate;
      wherein the auxiliary data comprises spatial data defining a valid region where the one or more events are to occur and an invalid region where events are not to occur;
      wherein the penalty functional is configured to generate a probability density map within the region of interest that restricts population of non-zero density estimates in the invalid region;
      wherein the penalty functional comprises a $H_1$ Sobolev functional;
   wherein the a probability density estimate is calculated according to the equation:

$$\hat{u}(x) = \operatorname{argmin}_{\int_\Omega u dx = 1, 0 \le u} \left\{ \frac{1}{2} \int_\Omega z_\epsilon^2 |\nabla u|^2 \, dx - \mu \sum_{i=1}^n \log(u(x_i)) \right\};$$

wherein u(x) is the desired probability density for $x \in R^2$;
wherein the known location of events occur at $x_1, x_2, \ldots, x_n$;
wherein μ corresponds to weighting of maximum likelihood compared to the penalty functional; and
wherein $z_\epsilon \rightarrow (1\delta(\partial D))$.

* * * * *